United States Patent [19]
Ando et al.

[11] Patent Number: 4,888,795
[45] Date of Patent: Dec. 19, 1989

[54] VIDEOTELEPHONE APPARATUS FOR TRANSMITTING HIGH AND LOW RESOLUTION VIDEO SIGNALS OVER TELEPHONE EXCHANGE LINES

[75] Inventors: Fumio Ando; Kazuo Ichinokawa; Takayuki Yokoyama, all of Tokyo, Japan

[73] Assignee: NEC Corporation, Japan

[21] Appl. No.: 212,498

[22] Filed: Jun. 28, 1988

[30] Foreign Application Priority Data

Jun. 30, 1987 [JP] Japan .................................. 62-163522
Jul. 24, 1987 [JP] Japan ............................. 62-113666[U]

[51] Int. Cl.⁴ ....................... H04M 11/00; H04N 7/14
[52] U.S. Cl. ........................................ 379/53; 379/96; 358/85
[58] Field of Search .................... 379/53, 54, 96, 110; 358/85

[56] References Cited

U.S. PATENT DOCUMENTS 3,781,477 12/1973 Johannesson .......................... 379/53
4,258,387 3/1981 Lemelson ............................... 379/53

OTHER PUBLICATIONS

Peter Klein, "Desktop Teleconferencing", Siemens Telcom Report, Jan./Feb. 1987.
Stephen Weinstein, "Telecommunications in the Coming Decades", IEEE Spectrum, Nov. 1987.

Primary Examiner—Jin F. Ng
Assistant Examiner—Bonita Lewis
Attorney, Agent, or Firm—Laff, Whitesel, Conte & Saret

[57] ABSTRACT

In an audiovisual communication, a first high fram rate video signal is derived from a motion image and converted to a low fram rate low resolution multiframe signal. A second high frame rate video signal is derived from an still image and converted to a single frame high resolution signal. Because of the low frame rates, the frequencies of the low and high resolution signals are within the range of frequencies of a telephone exchange line. A switching matrix is provided to sequentially couple both the low and high resolution signals to a transmission line in response to a mode select signal. The single frame high resolution signal is stored into a memory at the receiving end and repeatedly retrieved out of the memory into a display through the switching matrix.

41 Claims, 33 Drawing Sheets

SELF VIEW MODE

FACE-TO-FACE MODE

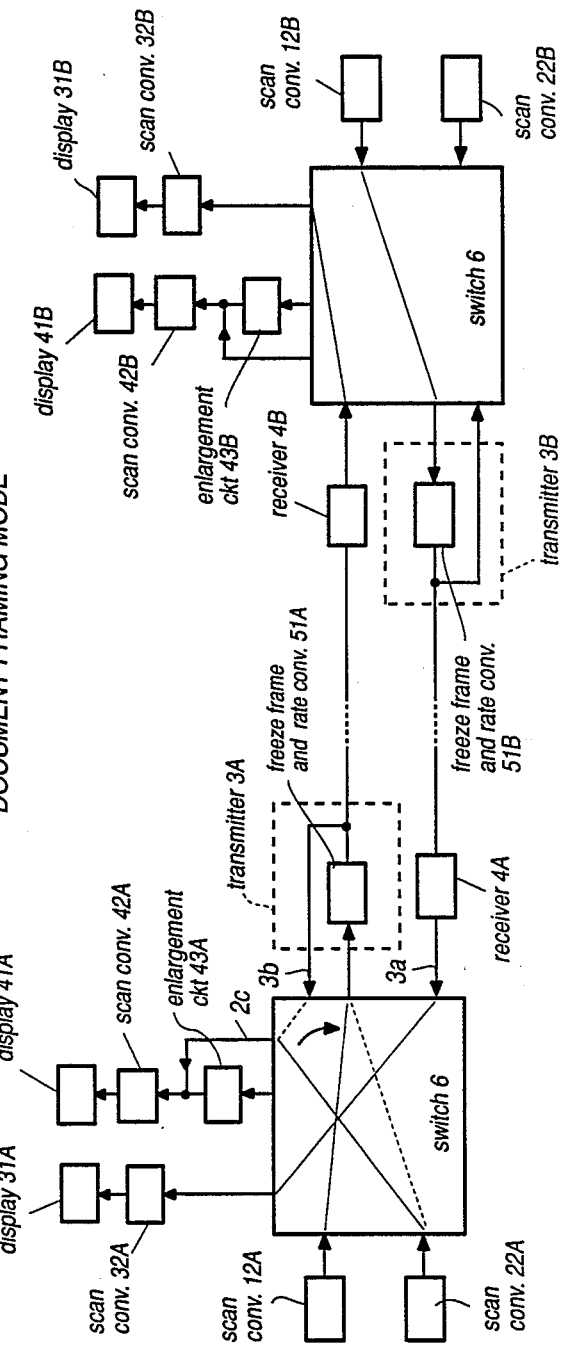

DOCUMENT TRANSMIT MODE

ENLARGE MODE
(VIEWING LOW RESL IMAGE ON LARGE SCREEN)

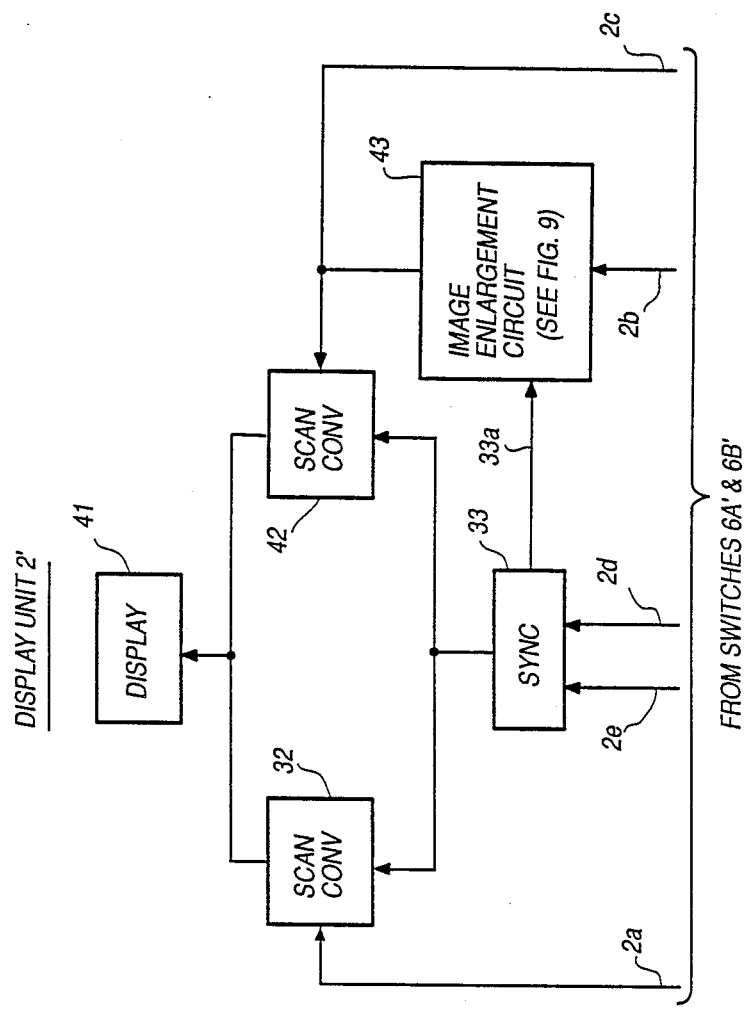

SELF VIEW MODE

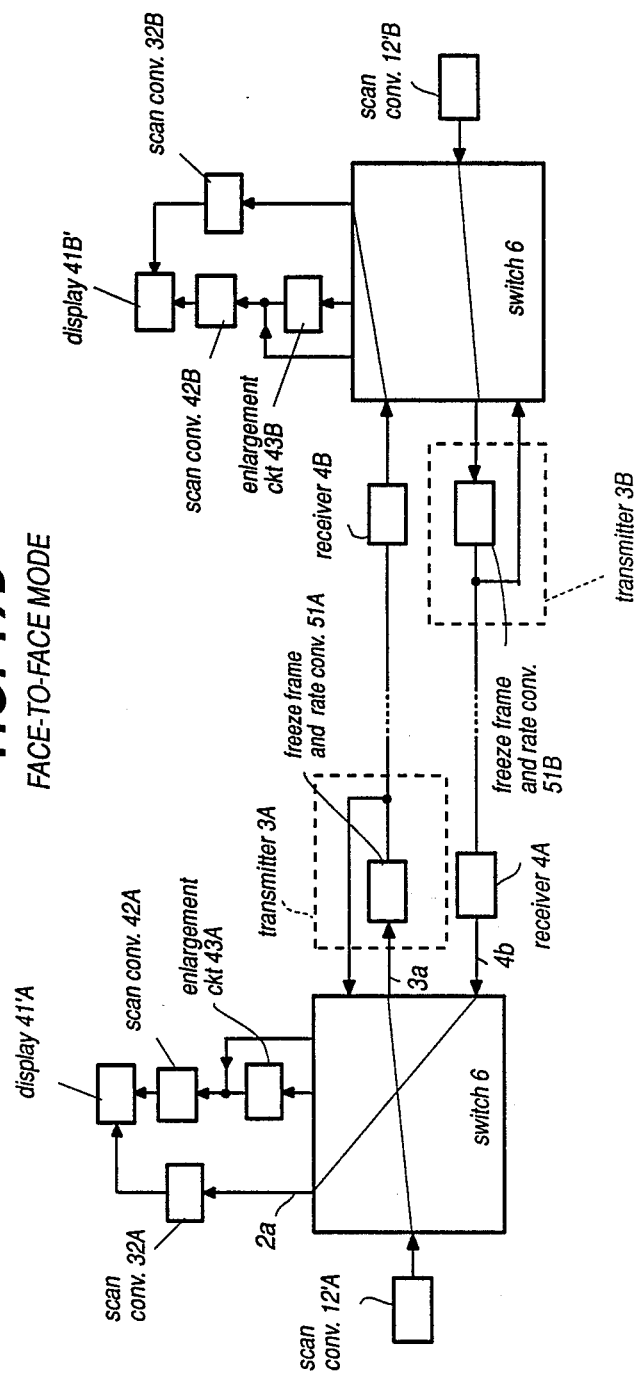

DOCUMENT FRAMING & TRANSMIT MODE

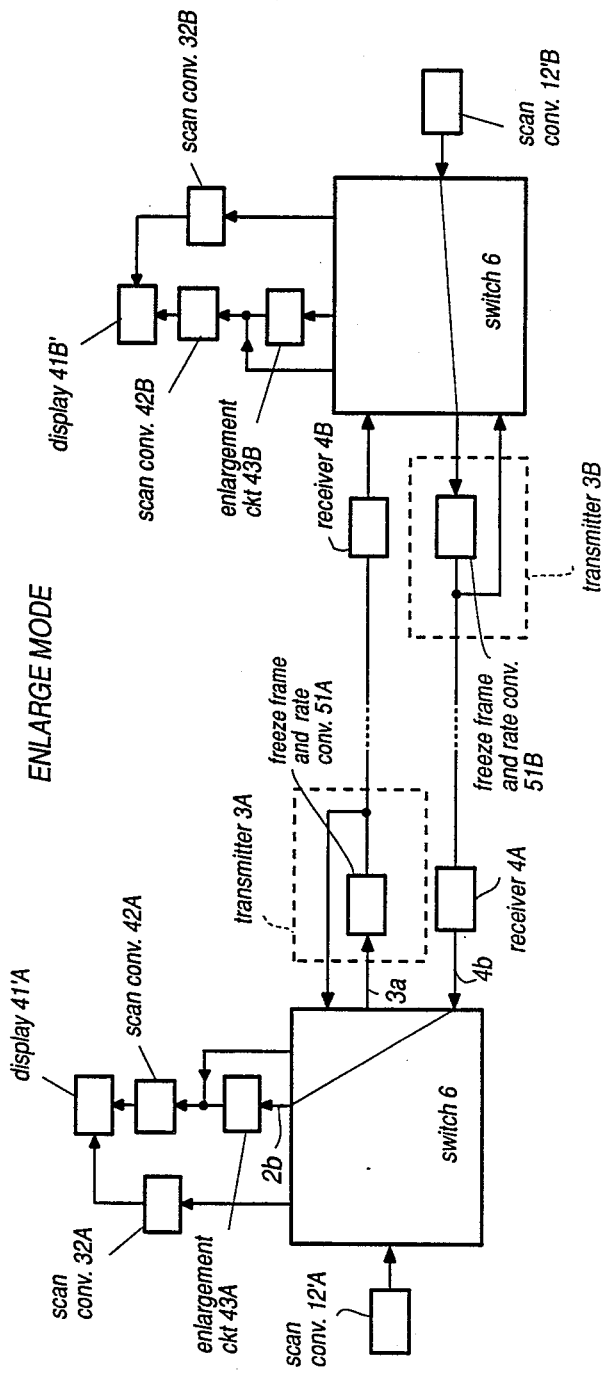
FIG. 19D ENLARGE MODE

VIDEOTELEPHONE APPARATUS FOR TRANSMITTING HIGH AND LOW RESOLUTION VIDEO SIGNALS OVER TELEPHONE EXCHANGE LINES

BACKGROUND OF THE INVENTION

This invention relates generally to audiovisual communication systems and, in particular, to a videotelephone apparatus for transmitting low frame rate video signals over telephone exchange lines.

Bell System's "Picturephone" is a typical example of audiovisual communication system. Because of the wide bandwidth, the prior art system is intended for use with a wideband, dedicated transmission line. It has therefore been desired to implement an audiovisual communication system having a bandwidth within the range of frequencies of telephone exchange lines. It has been further desired to implement a system which simultaneously performs face-to-face communications and document transmission.

SUMMARY OF THE INVENTION

It is therefore an object of the present invention to provide a videotelephone apparatus which transmits video signals within the range of frequencies of telephone exchange lines and allows face-to-face communications and document transmission simultaneously on a single or separate displays.

Another object of the present invention is to provide a videotelephone apparatus which can be used advantageously with ISDN (Integrated Services Digital Network) exchange lines.

In accordance with the present invention, a first high frame rate video signal is derived from an image containing moving objects and a second high frame rate video signal is derived from an image containing standstill objects. The first high frame rate video signal is converted to a low frame rate low resolution multiframe signal and the second high frame rate video signal is converted to a single frame high resolution signal. In a typical example, the low frame rate low resolution signal is transmitted at a rate of five frames per second and the single frame high resolution signal is transmitted during the interval of 1 to 4 seconds. Each frame of the low resolution signal has nxm pixels, typically 80×60 pixels and the frame of the high resolution signal has N×M pixels, or 320×240 pixels. Because of the low frame rates, both low and high resolution signals are within the range of frequencies of a telephone exchange line. A switching matrix is provided to sequentially couple the low frame rate low resolution signal and the single frame high resolution signal to a transmission line in response to a mode select signal and couple the exchange line to a display unit. At the receiving end of the exchange line, the single frame high resolution signal is stored into a memory and repeatedly read out of the memory into a display.

Alternatively, the second high frame rate video signal that conveys the image of a document is first converted to a multiframe high resolution signal and the latter is then converted to the single frame high resolution signal. Manually operated command keys are provided to generate a framing command signal and a document transmit command signal during face-to-face communications. In response to the framing command signal, the switching matrix couples the multiframe high resolution signal to the display to allow the user to adjust the position of a document so that it comes into the field of view. In response to the transmit command signal, the low resolution signal is disconnected from the transmission line to allow transmission of the single frame high resolution signal to the distant end while switching the display input from the multiframe high resolution signal to the transmitted single frame high resolution signal to allow the source viewer to monitor the freeze frame image of the document actually transmitted. At the end of transmission of the single frame high resolution signal, the low resolution signal is reconnected to the transmission. The display unit preferably includes a frame memory to retain the frame of a received low resolution signal which has been received just prior to the reception of a single frame high resolution signal to keep the last frame on display when it is interrupted during the transmission of the single frame high resolution signal.

A still picture detector is preferably provided which responds to the framing command signal for detecting a still motion in the high resolution multiframe signal. The switching matrix responds to the detection of a still motion and couples the single frame high resolution signal to the exchange line for transmission to the other party and to the display for confirmation.

For displaying low and high resolution images, two flat panel displays respectively having nxm and N×M pixels are mounted on a rear, higher profile portion of a housing, with the nxm pixel display being located in a position higher than the N×M pixel display. Alternatively, an N×M pixel flat panel display may be provided instead of two displays to provide both low and high resolution images in an individual or superimposed mode. An image enlarging circuit is advantageously provided for multiplying each pixel of a received low frame rate low resolution signal by a factor N×M/nxm to display the received signal on the (N×M) pixel display.

To facilitate audiovisual communications over a transmitted document, a screen touch sensor is provided for supplying a coordinate signal indicating a point specified on the N×M pixel display unit in a coordinate system to a marker generator which transmits a marker code in response to the coordinate signal to the transmission line.

In a preferred embodiment, a pivoted arm is provided on the housing, the arm being movable between a rest position in the housing and an upright position. A video camera is mounted at the free end of the arm to pick up the user's own face when the arm is in the rest position and pick up a document when the arm is in the upright position. A switch is located adjacent the pivot point of the arm to generate a framing command signal when the arm is brought to the upright position to cause the switching matrix to automatically switch the input of the display to the high resolution multiframe signal for "framing" the document.

In accordance with a second aspect of the present invention, the first and second high frame rate video signals, which are representative of moving and standstill objects respectively, are converted by a data compression circuit to a low resolution multiframe signal according to a data compression algorithm and the second high rate video signal is converted to a high resolution single frame signal according to the data compression algorithm. A data expansion circuit is provided for converting a received low resolution multiframe signal and a received high resolution single frame signal to signals according to a data expansion algorithm inverse to the data compression algorithm. The data compression circuit comprises first and second coding circuits having a hierarchical coding algorithm. The data compression circuit includes a plurality of spatial frequency filters of different resolutions through which the first and second high frame rate video signals are passed to develop differential video signals of different levels of resolution. The differential video signals are successively transmitted with the lowest level of resolution first and an intermediate level of resolution last when transmitting a low resolution multiframe signal and all the differential video signals are successively transmitted with the lowest level of resolution first and the highest level of resolution last when transmitting a single frame high resolution signal.

The data compression circuit comprises a frame memory, a write address generator for writing the first and second video output signals into the frame memory at a frame rate lower than the frame rate of the video output signals. To the output of the memory is connected a microprocessor which performs discrete cosine transform (DCT) on data stored in the frame memory on a block by block basis, performs scaler quantization and performs modified Huffman coding on data stored in a smaller portion of each of the blocks in response to a first control signal from the switching circuit and repeating the previous steps to generate the low frame rate low resolution signal. The modified Huffman coding is performed on data stored in a greater portion of each of the blocks in response to a second control signal from the switching circuit to produce the single frame high resolution signal.

BRIEF DESCRIPTION OF THE DRAWINGS

The present invention will be described in further detail with reference to the accompanying drawings, in which:

FIGS. 10A to 10E are schematic diagrams useful for describing the mode of operation of the first embodiment of the invention;

FIG. 18 is a block diagram of the display unit of FIG. 16;

FIGS. 19A to 19D are schematic diagrams useful for describing the operation of the second embodiment;

DETAILED DESCRIPTION

Figure 1:
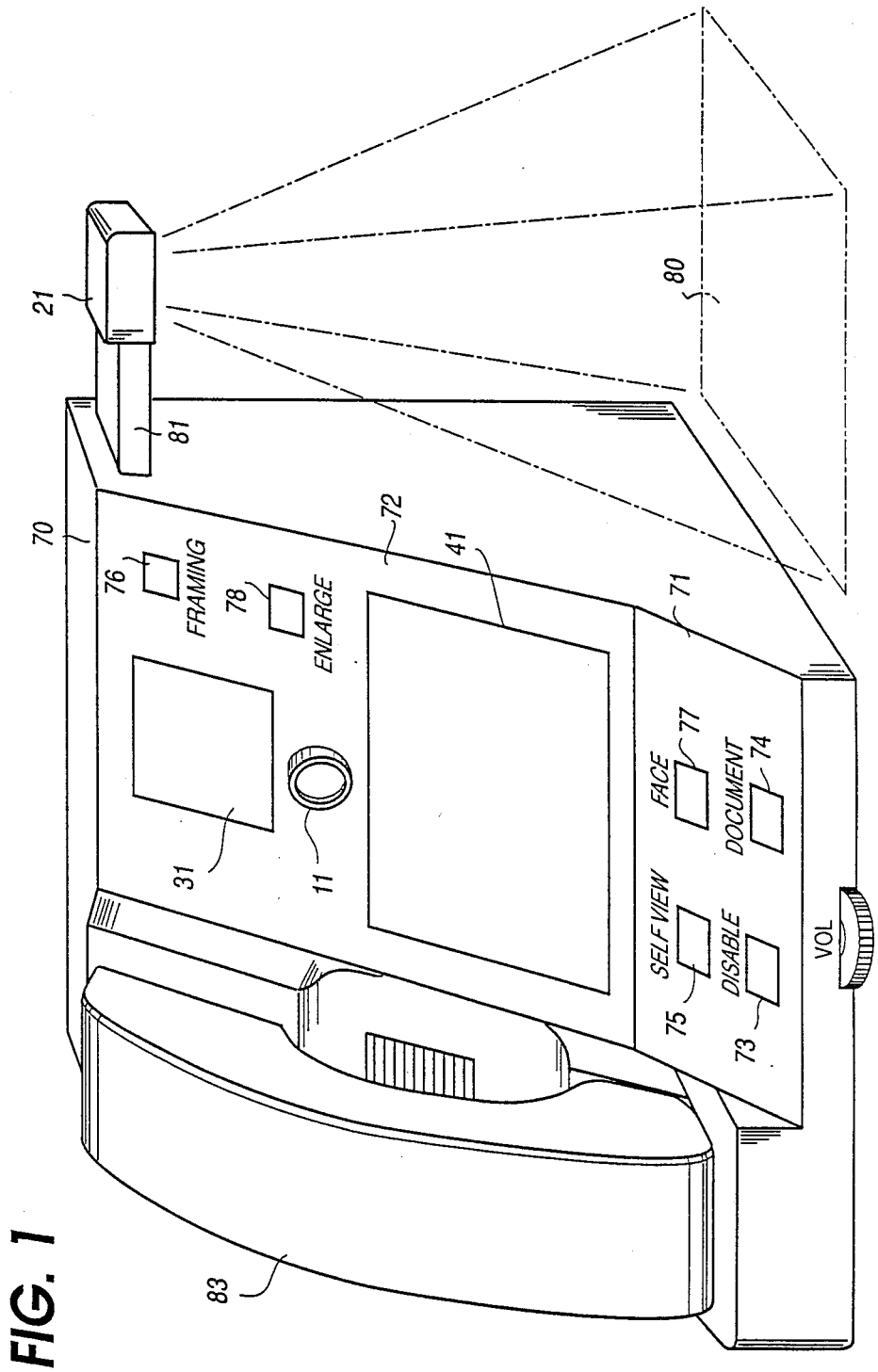
FIG. 1 is a schematic illustration of perspective view of a videotelephone set according to a first embodiment of the invention.

Referring now to FIG. 1, there is shown a videotelephone set according to a first embodiment of the present invention. The videotelephone set comprises a housing 70 having a front lower portion 71 and rear upper portion 72. On the surface of front lower portion 71 are manually operated mode select keys including "Disable" key 73 which is used when one does not want to be seen, "Document" key 74 for sending a document, "Self View" key 75 to monitor the one's own view, "Face" key 77 for face-to-face communications, and "Enlarge" key 78. A ($320 \times 240$)-pixel flat panel display 41 is mounted on the rear upper portion 72 and an ($80 \times 60$)-pixel flat panel display 31 is located above the display 41. Between displays 31 and 41 is a camera 11 for viewing a viewer's face. A second video camera 21 is mounted on an arm 81 which is manually pulled out of the housing 70 when in use. Adjacent to the camera 21 is another manually operated key 76 designated "Framing". The "Framing" key 76 is operated when the arm 81 is pulled out to allow the position of the camera 21 to be adjusted with respect to the document to put it into the field of view. A telephone handset 83 is located on one side of the video display portion of the housing to provide audio communications.

Figure 2:
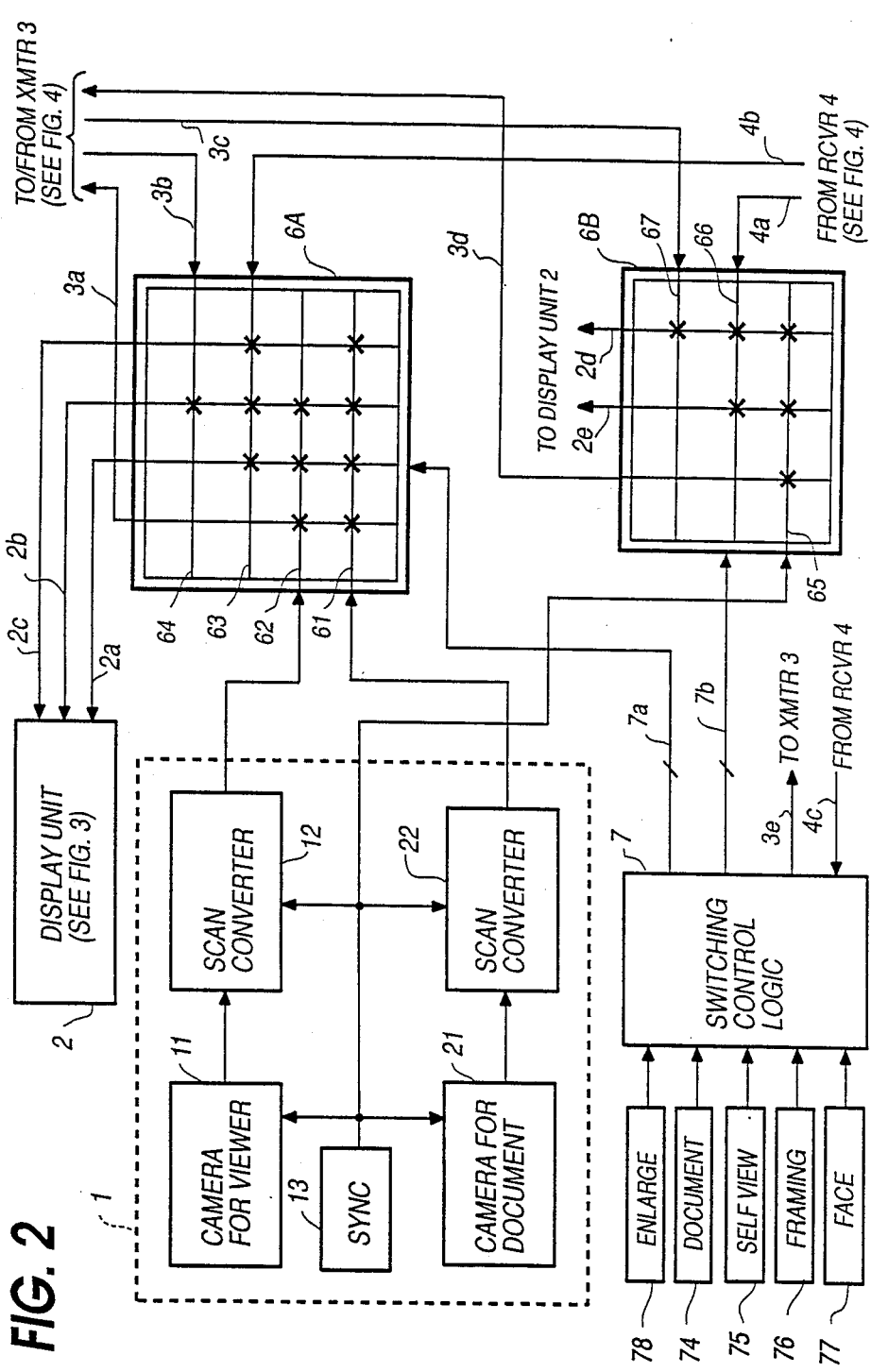
FIG. 2 is a block diagram of the videotelephone set of FIG. 1.

In FIG. 2, the videotelephone set comprises an image pickup unit 1, a display unit 2, a video transmitter 3, a video receiver 4, matrix switches 6A, 6B and a switching control logic 7 which is associated with the mode select keys 74 to 77. Image pickup unit 1 includes the first and second video cameras 11 and 21. Each of the video cameras produces an analog television signal of a standard television format.

A scan converter 12 is connected to the output of video camera 11 to convert the high frame rate video signal into a high frame rate low resolution multiframe signal. Typically, the low resolution multiframe signal has a resolution of $80 \times 60$ pixels from which a low frame rate low resolution multiframe signal will be derived for transmission in a manner to be described. A scan converter 22 is connected to the output of video camera 21 to derive a high frame rate high resolution signal having 320×240 pixels from which a high resolution freeze frame signal will be derived for transmission. All the circuit components of image pickup unit 1 operate on timing signals including horizontal and vertical sync and blanking pulses supplied from a sync generator 13.

The outputs of scan converter 12 and scan converter 22 are applied to switch 6A and the output of sync generator 13 is applied to switch 6B. Each of the switches 6A and 6B is of a conventional matrix type having crosspoints at the intersections of appropriate rows and columns, which are marked with symbols "x" where switching takes place between desired row and column lines. The outputs of scan converter 22 and 12 are connected to the first and second rows 61, 62 of switch 6A each having three crosspoints which allow access to an input line 3a of transmitter 3 and to input lines 2a and 2b of display unit 2. An output line 4b of receiver 4 and an output line 3b of transmitter 3 are connected to the third and fourth rows 63, 64 of switch 6A, respectively, the crosspoints on the third row 63 allowing the receiver output line 4b to access input lines 2a, 2b and 2c of display unit 2. The fourth row 64 has only one crosspoint which establishes a connection between the transmitter output line 3b and the input line 2b of display unit 2.

The output of sync generator 13 is supplied to the first row 65 of switch 6B having crosspoints that allow access to input lines 2d and 2e of display unit 2 and an input line 3d of transmitter 3.

Receiver 4 and transmitter 3 have output lines 4a and line 3c respectively coupled to the third and fourth rows 66 and 67 of switch 6B. Crosspoints on row 66 allow access to display unit 2 via input lines 2d and 2e and a crosspoint on row 67 allows a connection to be established to display input line 2d.

Figure 5:
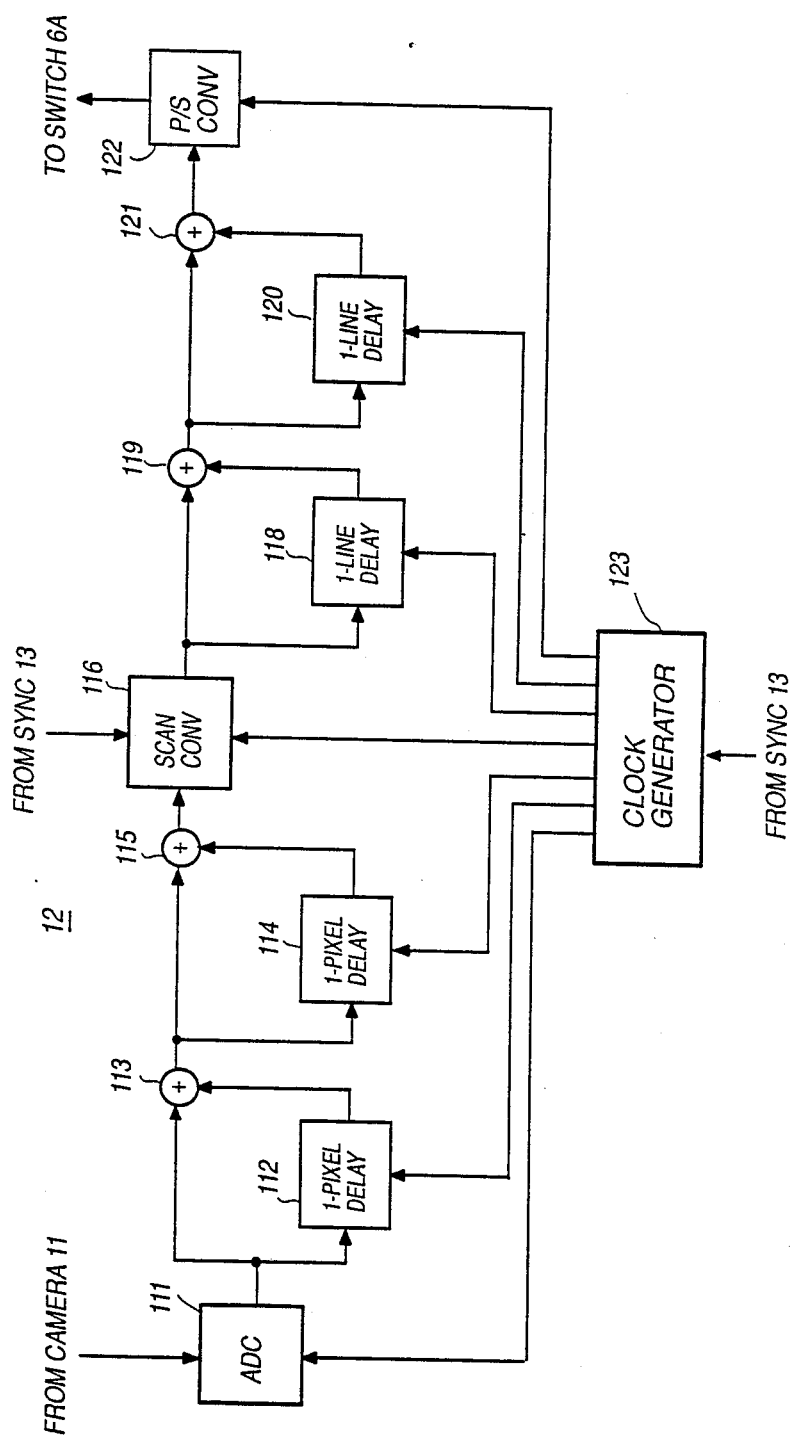
FIG. 5 is a block diagram of the scan converter of FIG. 1.

Details of the scan converter 12 afe shown in FIG. 5. Converter 12 includes a clock generator 123 which receives sync and control signals from the sync generator 13 to generate a 6.048-MHz clock pulse which is 384 times higher than the 15.75-kHz line frequency of the standard television signal. An analog-to-digital converter 111 is connected to the output of camera 11 and is supplied with the 6.048-MHz clock pulse from clock generator 123 to sample the analog television signal at 6.048MHz to produce 320 digital video samples, or pixels during the effective line scan period, namely, 53-microsecond duration. Each pixel is converted into a 4-bit digital video signal by A/D converter 111 so that it can represent white to black with 16 levels of grey scale, the 4-bit video signal being fed on parallel lines to the input terminals of a 5-bit adder, or averaging circuit 113, of the first of a series of resolution conversion stages, one through a direct path and the other through a one-pixel delay 112. One-pixel delay 112 comprises a set of four shift registers, for example, which are clocked with pulses from clock generator 123 to shift the 4-bit digital output from A/D converter 111 at each clock cycle and read out 4-bit digital outputs at every two clock cycles, so that the signal applied through delay 112 to adder 113 is delayed one pixel with respect to the signal directly applied to adder 119. The successively delayed 4-bit data are summed by adder 113 to produce a 5-bit output and the higher 4-bits of the output are delivered at every two clock cycles, discarding the least significant bit of the sum. In this way, the sum is divided by two and the 4-bit output of adder 113 represents an average value of two video samples each being delayed one pixel from the other, and two successive pixel outputs from the A/D converter 111 are converted to one pixel by the adder 113 at two-pixel intervals.

The output of adder 113 is connected to the input terminals of a 5-bit adder 115, identical to adder 113, of the next stage, one through a direct path and the other through a one-pixel delay 114. Delay 114 is clocked at one half the clock rate of the first delay conversion stage by the clock generator 123. In a manner similar to the first stage, two successive pixels from adder 113 and hence four successive pixels from A/D converter 111 are converted to one pixel by adder 115 which is an average of the original successive four pixels. By the first and second coarsening stages, the resolution of the original image is reduced by a factor 4/1 in the direction of horizontal scan.

The 4-bit outputs of adder 115 are applied to a scan converter 116 which is connected to receive control signals from the sync generator 13 and clock pulses from the clock generator 123 to generate an address signal for each pixel input from the second stage. Scan converter 116 includes a video memory with a capacity of 76,800 bits (=80×240×4) and a memory control circuit for writing the output of adder 115 of an odd field composed of 240 horizontal lines into the video memory in response to the address signal. To compensate for the delays introduced by the first and second stages of resolution conversion, the scan converter 116 further includes a delay, not shown, by which the control signals from the sync generator are delayed by an amount equal to the total delay introduced by the previous stages. The video memory of the scan converter 116 is read out at 756 kHz which is equal to one half the rate of the write mode to produce a noninterlaced "frame" at one half the frame rate of the standard interlaced television scan format. Four parallel bits are supplied from the scan converter 116 to the third stage of resolution conversion which is made up of a one-line delay 118 and a 5-bit adder 119. One-line delay 118 is formed by a set of four shift registers of 80 bits each which are driven at 756 kHz which is the same rate as the read-out rate of the scan converter 116. The 4-bit output of the scan converter 116 which represents a given horizontal line and the 4-bit output of the one-line delay 118 which represents a line immediately preceding the given horizontal line are fed to the 5-bit adder 119 and pixels on the adjacent horizontal lines are summed and the higher 4 bits of the sum are delivered at a rate one half the rate of write operation to produce an average value of the pixels on adjacent lines. In this way, the resolution of the image is coarsened in the direction of vertical scan by a factor 2/1. The output of adder 119 is then applied to the fourth stage of resolution conversion which is identically constructed to the third stage by a one-line delay 120 and a 5-bit adder 121 to reduce the resolution by a factor 2/1 in the direction of vertical scan. In this way, the resolution is reduced by a factor 4/1 in the vertical direction of the image as in the horizontal direction. The output of adder 121 is fed to a parallel-to-serial converter 122. The output of the converter 122 has a pixel scan rate of 189 kHz and a maximum video frequency of 756 kHz (equal to the clock rate) with 30 frames per second and is applied to the switching circuit 6A. By the above resolution conversion processes, the original analog video signal of 320×240 pixels from the camera 11 is converted to a digital video signal of 80×60 pixels.

Figure 6:
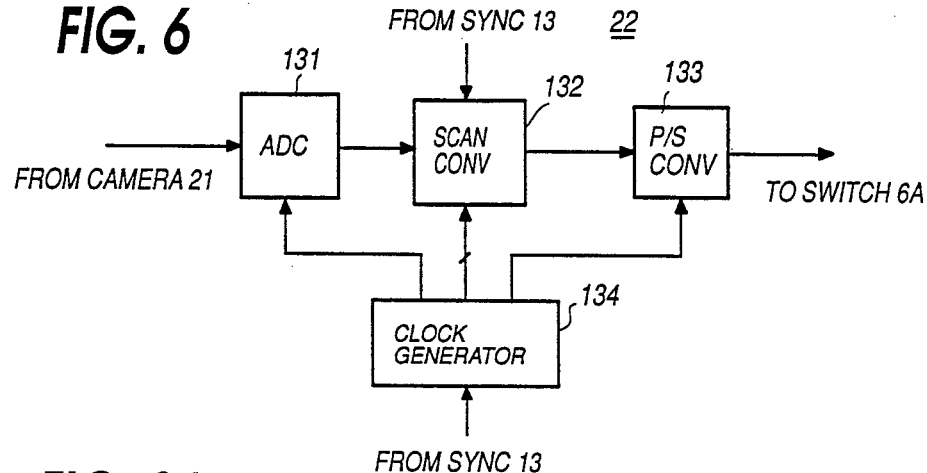
FIG. 6 is a block diagram of the scan converter of FIG. 1.

As shown in FIG. 6, the scan converter 22 includes an analog-to-digital converter 131, a scan converter 132, a parallel-to-serial converter 133 and a clock generator 134. A/D converter 131 is connected to the output of camera 21 and is supplied with the 6.048-MHz clock pulse from clock generator 134 to sample the analog video signal at the clock rate to produce 320 pixels during the effective line scan period as in A/D converter 111. A 4-bit digital video signal is generated by A/D converter 131 for each pixel in response to each clock pulse to allow reproduction of a pixel with 16 levels of gradation, the 4-bit video signal being fed on parallel lines to the scan converter 132 which is connected to receive control signals from the sync generator 13 and clock pulses from the clock generator 134 to generate an address signal for each pixel input from the A/D converter 131. Similar to scan converter 116, the scan converter 132 includes a video memory with a capacity of 76,800 bits and a memory control circuit for writing the output of A/D converter 131 at odd field intervals into the video memory in response to the address signal. The video memory of the scan converter 132 is read out at one half the rate of the write mode to produce a noninterlaced frame at one half the frame rate of the standard television scan format. The 4-bit parallel outputs of scan converter 132 are converted to a serial 4-bit signal by the parallel-to-serial converter 133.

Digital switching control signals are supplied on respective parallel-bit lines 7A and 7B to switches 6A and 6B from switching control logic 7 in response to a command signal supplied from command entry keys 74–77 and an input signal from receiver 3 through an input line 4c in accordance with a switching algorithm which can be implemented with a simple logic table. Details of the switching operation will be described later.

Figure 3:
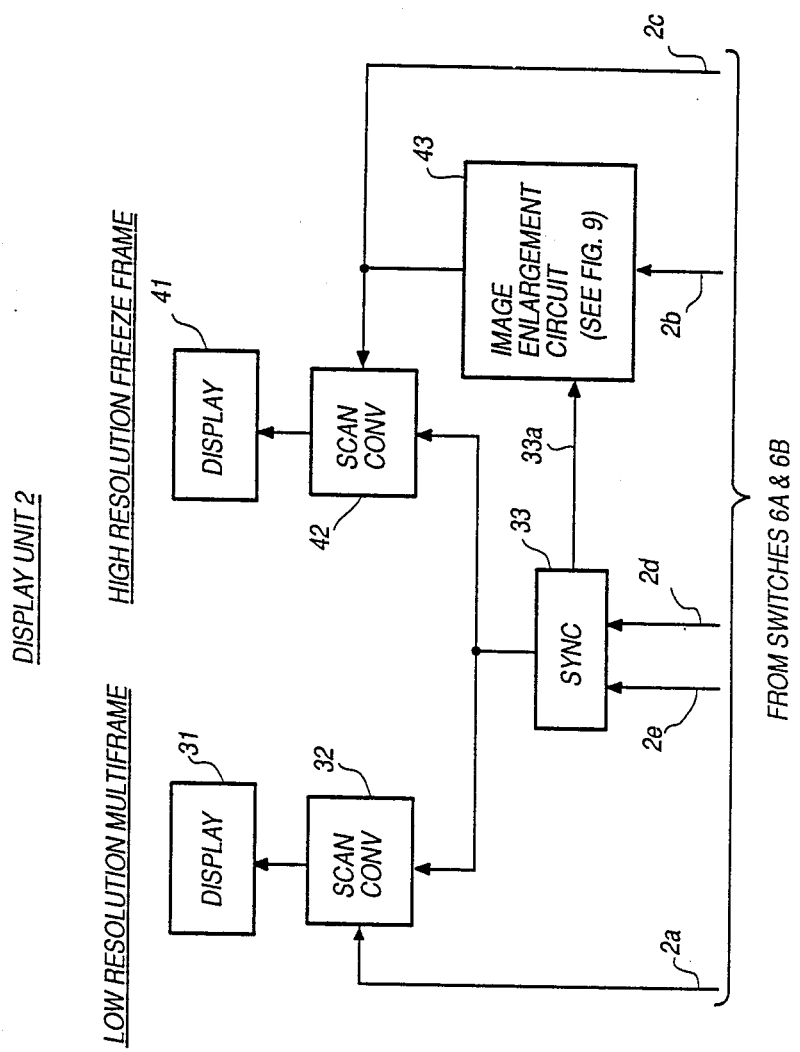
FIG. 3 is a block diagram of the display unit of FIG. 1.

As shown in FIG. 3, the display unit 2 comprises the small screen display 31 having a screen resolution of 80×60 pixels for providing a display of a viewer seated in front of the camera 11 and the large screen display unit 41 having a screen resolution of 320×240 pixels for providing a display of high resolution freeze-frame pictures. A scan converter 32 having an (80×60×4)-bit video memory is driven by a sync generator 33 to write a low resolution multiframe signal at a rate of 30 frames per second and read it at a rate of 60 frames per second out of the memory into the small screen display 31, so that each pixel is read twice from the scan converter 32. This frame rate conversion has the effect of reducing flicker. A scan converter 42 includes a (320×240×4)-bit video memory which is clocked by the sync generator 33 to write a high resolution freeze frame signal at 30 frames per second and read it at 60 frames per second out of the memory into the second image display unit 41. The input lines 2d and 2e from matrix switch 6B are connected to the sync generator 33 to regenerate the necessary timing signals necessary for scan converters 32 and 42 and input lines 2a and 2c from switch 6A are supplied to scan converters 32 and 42, respectively. The input line 2b from switch 6A is coupled to an image enlargement circuit 43 whose output is in turn connected to the scan converter 42. Normally, the low resolution multiframe signal from the receiver 4 is coupled to the scan converter 32 via line 2a and displayed on the 80×60 pixel screen of the display 31. However, the invention allows it to be displayed on the 320×240 pixel screen of the display 41 if desired. The image enlargement circuit 43 is intended for this purpose and details of this circuit will be described later.

Figure 4:
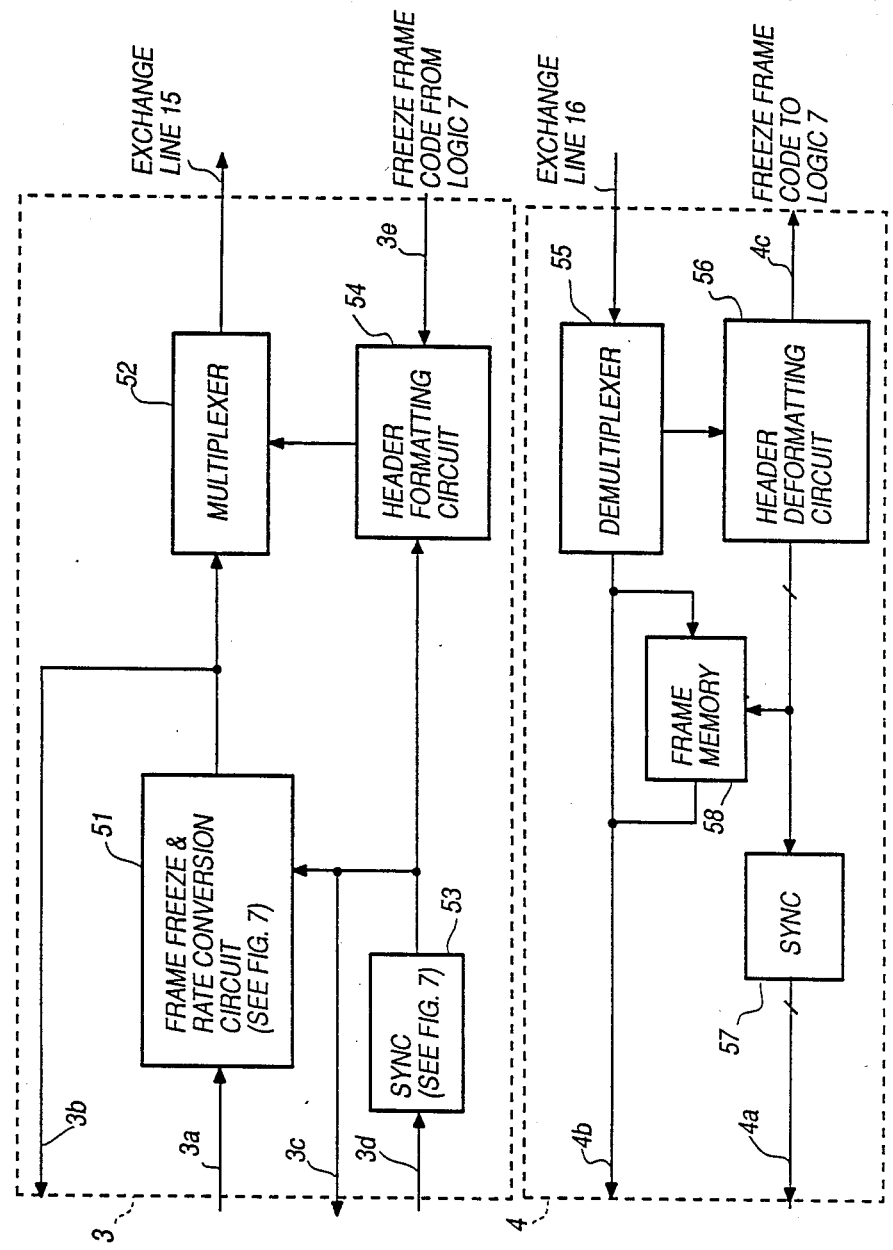
FIG. 4 is a block diagram of the video transmitter and receiver of FIG. 1.

FIG. 4 shows details of the transmitter 3 and receiver 4. Transmitter 3 comprises a frame freeze and rate conversion circuit 51 which is coupled to receive both high and low resolution signals on input line 3a from switch 6A. The output of the circuit 51 is connected to a multiplexer 52 whose output is in turn connected to an exchange line 15. As will be described, frame freeze and rate conversion circuit 51 includes a memory which is driven by a sync generator 53 to write the high and low resolution signals. Sync generator 53 discriminates between control signals supplied on input line 3d through switch 6B to cause the circuit 51 to perform different processing operations on the low and high resolution signal depending on signals on input line 3d. Receiver 4 includes a demultiplexer 55 to which a second exchange line 16 is terminated to demultiplex the incoming video signal into a header and a data field, the former being supplied to a header deformatting circuit 56 which detects a freeze frame code contained in the header and supply it on output line 4c supplied on input line 4c to the switching control logic 7 and detects a sync code and feeds a sync generator 57. Further, the header deformatting circuit 56 drives a frame memory 58 if it detects a freeze frame code in the demultiplexed header to store the received freeze frame into the memory 58 and repeatedly reads it from the memory for coupling to the switch 6A through output line 4b.

Figure 8A:
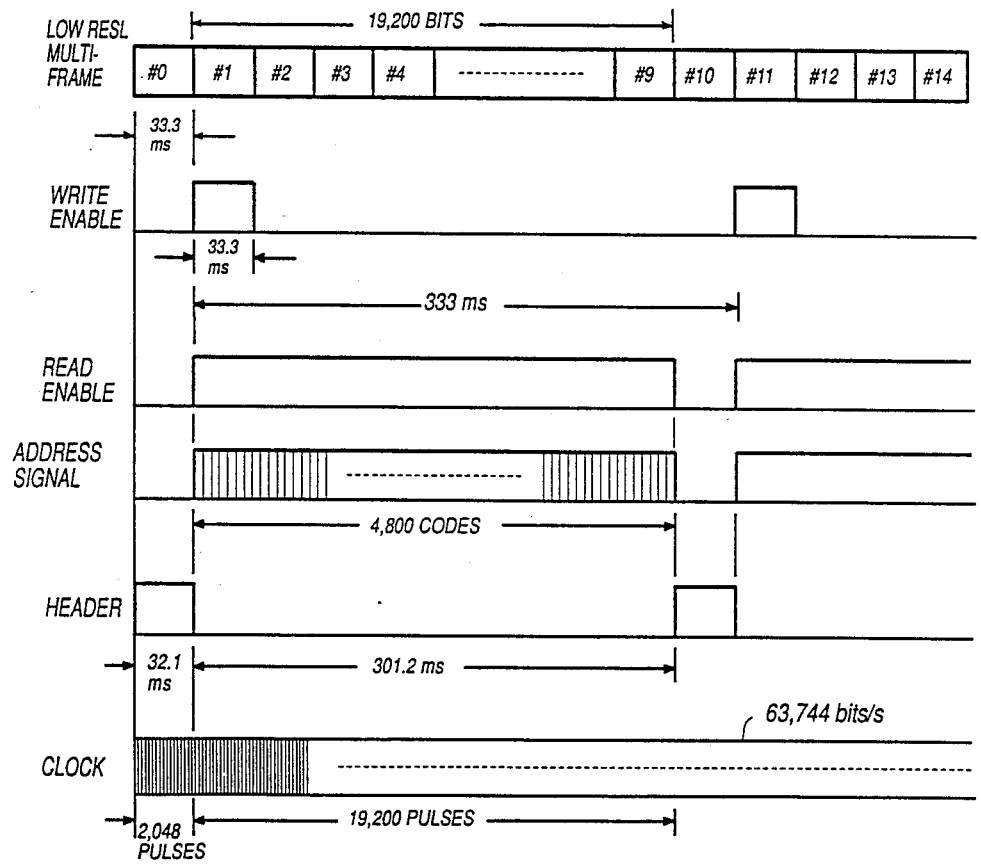
FIGS. 8A, 8B and 8C are views associated with the freeze frame and rate conversion circuit.
Figure 7:
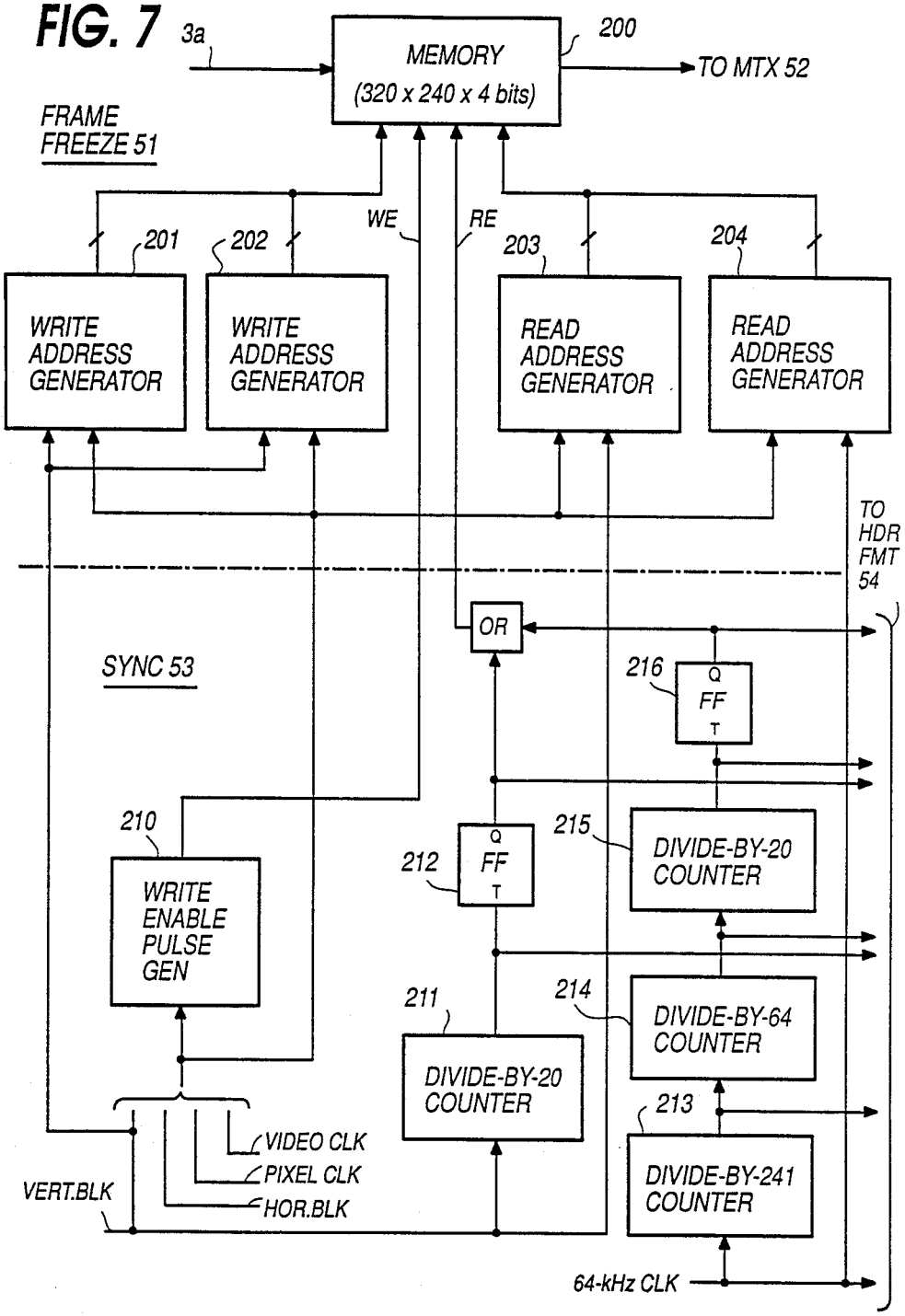
FIG. 7 is a block diagram of the freeze frame and rate conversion circuit and the sync generator of the receiver of FIG. 1.

As illustrated in FIG. 7, the frame freeze and rate conversion circuit 51 comprises a 320×240 pixel read-/write memory 200 of the dual port type to which the signal on input line 3a is applied and from which the stored signal is read into the multiplexer 52. Further included in the frame freeze and rate conversion circuit 51 is a pair of write address generators 201 and 202 and a pair of read address generators 203 and 204. The multibit address codes of the write address generators 201, 202 are connected to the write address port of the memory 200, those of the read address generators 203, 204 being connected to the read address port of the memory. Write and read address generators 201 and 203 are used to write and read the low resolution signal and write and read address generators 202 and 204 are used to write and read the high resolution signal. The freeze frame and rate conversion circuit 51 is supplied with various control signals from the sync generator 53. Specifically, the sync generator 53 includes a write enable pulse generator 210. In response to a count of 2,048 clock pulses (FIG. 8A) on line 3d from the sync generator 13, pulse generator 210 generates a write enable pulse with a duration of 33.3-ms which corresponds to the frame period of both low and high resolution signals. This write enable pulse is applied to the memory 200 to enable it to store the first frame of either low or high resolution signal.

Figure 8B:
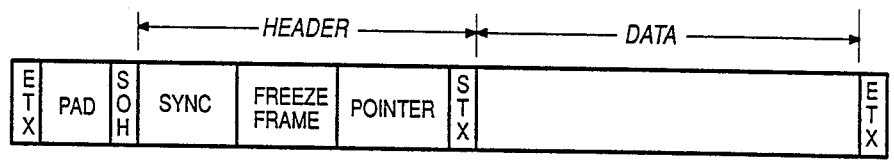

If the input signal to the memory 200 is a low resolution signal, the write address counter 201 is activated to supply a write address to store the first of a series of frames on an 80×60 pixel plane of the 320×240 pixel plane of the memory, and a vertical blanking signal is supplied from the sync generator 13 to a divide-by-20 counter 211. Simultaneously with the generation of the write enable pulse, the divide-by-20 counter 211 initiates counting the vertical blanking pulse and generates a pulse at the count of every 20 interlace fields of broadcast television signal format. The output of the counter 211 is successively fed to a T flip-flop 212 to generate a read enable pulse with a duration of 302.1 ms, this read enable pulse being supplied to the memory 200. Read address generator 203 is activated to count clock pulses to generate 4,800 (=80×60 pixels) read address codes during the period of 333 ms to produce a video output which is combined with a header with a duration of 32.1 ms so that a low resolution multiframe signal with a frame rate of substantially 1/10 the rate of the original signal can be obtained. As shown in FIG. 8B, the header is preceded by an end-of-text (ETX) code and a pad and contains a start-of-header code (SOH), a sync code, a freeze frame code, a pointer code (which will be described later) and a start-of-text (STX) code. If the signal is a low resolution signal, the code fields of freeze frame and pointer are filled with all binary 0's.

Figure 8C:
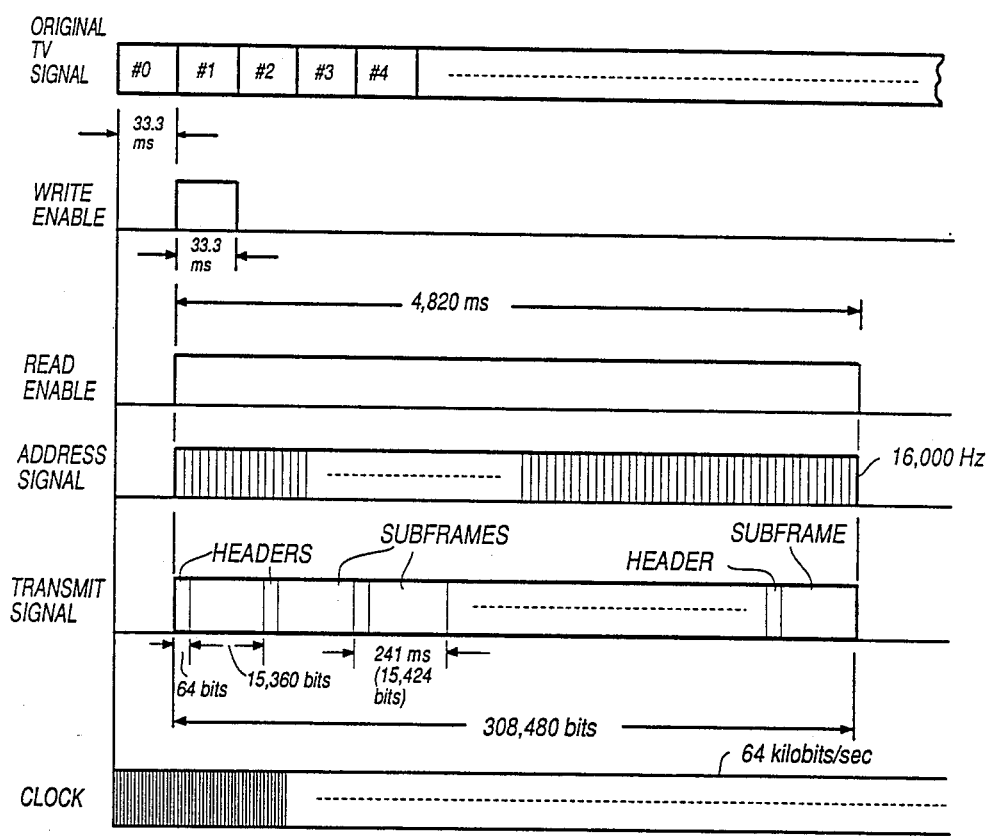

If the input signal of the memory 200 is a high resolution signal, the write address counter 202 is activated to generate a write address code to store the first of a series of the high resolution frames into the full 320×240 pixel plane of the memory 200, and a 64-kilobit clock pulse (which corresponds to a maximum transmission bit rate) is supplied to a divide-by-241 counter 213. Simultaneously with the generation of the write enable pulse, the divide-by-241 counter 213 initiates counting the 64-kilobit clock pulse and drives a divide-by-64 counter 214 which in turn drives a divide-by-20 counter 215 which generates a pulse at the count of every 308,480 bits of transmission. The output of the counter 215 is successively fed to a T flip-flop 216 to cause it to generate a read enable pulse with a duration of 4,820 ms, this read enable pulse being supplied to the memory 200. Read address generator 204 is activated to count 64-kilobit clock pulses to generate a 16-kHz read address code during the period of 4,820 ms (see FIG. 8C) to read the stored frame to produce twenty subframes of the stored frame, thus freezing the high resolution signal. Each of the subframes has 15,360 bits and is multiplexed by the multiplexer 52 with a 64-bit header similar to the header shown in FIG. 8B supplied from a header formatting circuit 54. Header formatting circuit 54 receives various timing signals from the sync generator 53 and a freeze frame code on input line 3e from the switching control logic 7 to generate a header.

Figure 9:
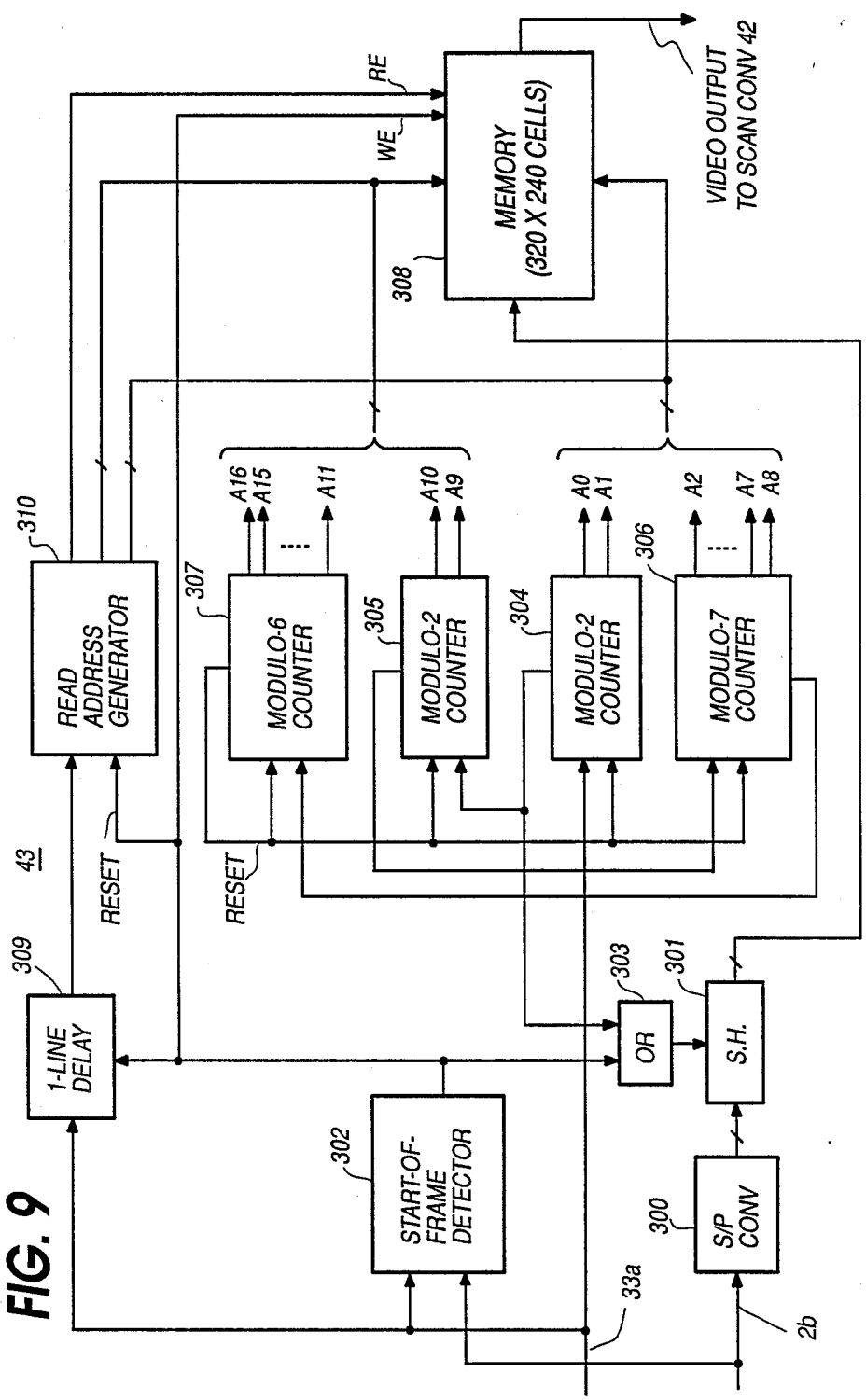
FIG. 9 is a block diagram of the image enlargement circuit of FIG. 1.

FIG. 9 is an illustration of details of the image enlargement circuit 43 of FIG. 3. The serial input signal on input line 2b is converted to a 4-bit parallel signal by a serial-to-parallel converter 300 and fed to a sample-and-hold circuit 301 where it is first sampled in response to a first clock from a start-of-frame detector 302 via an OR gate 303 and subsequently in response to a clock supplied via the OR gate from a modulo-2 write address counter 304 which is generated at ¼ the rate of video clock supplied on a line 33a from the sync generator 33. This video clock corresponds to the bit rate of the high resolution signal and therefore the sampling rate corresponds to the bit rate of the low resolution signal. Thus, each pixel of the signal is sampled and held until the arrival of the next pixel. Four-bit video samples are fed to a (320×240)-cell memory 308 of the dual port type which can read stored data simultaneously with write operation. The video clock on line 33a from sync generator 33 is fed to the modulo-2 counter 304 to generate address codes in response to each video clock pulse to specify the lower significant column address positions A0 and A1 of the memory 308. At every four video clock pulses, a carry output is generated by modulo-2 counter 304 and fed to a modulo-2 write address counter 305 as well as to OR gate 303. Modulo-2 counter 305 generates address codes for every four video clock pulses to specify the lower significant row positions A9 and A10 of the memory 308. At every sixteen video clock pulses, modulo-2 counter 305 generates a carry output which is fed to a modulo-7 write address counter 306 which generates address codes for every sixteen video clock pulses to specify the column positions A2 to A8 of the memory 308. At every 320 video clock pulses, modulo-7 counter 306 supplies a carry output to a modulo-6 write address counter 307 to cause it to specify the row positions A11 to A16 of the memory 308. Counter 307 generates a carry output at the count of 240. This carry output is supplied to all the counters 304 to 307 as a reset pulse to clear their contents. In this way, every sixteen video samples of a low resolution signal are sequentially stored in 4×4 cells of the memory 308 and the original 80×60 pixels of the low resolution signal are stored into the 320×240 cells of the memory, enlarging the original image by a factor 16 to fit into the screen of display 41.

While the write operation is in progress, a one-line delay 309 is supplied with the output of start-of-frame detector 302 and the clock input on line 33a to pass the clock input delayed one horizontal line with respect to the start of the write operation to a read address generator 310 which is reset by the start-of-frame detector 302 to initiate a read operation in response to the higher rate video clock from sync generator 33. In this way, the stored data is read out of memory 308 in a sequential manner into the scan converter 42 simultaneously with the write operation. The simultaneous read and write operations allow received signals to be displayed without a substantial loss of time.

Figure 10A:
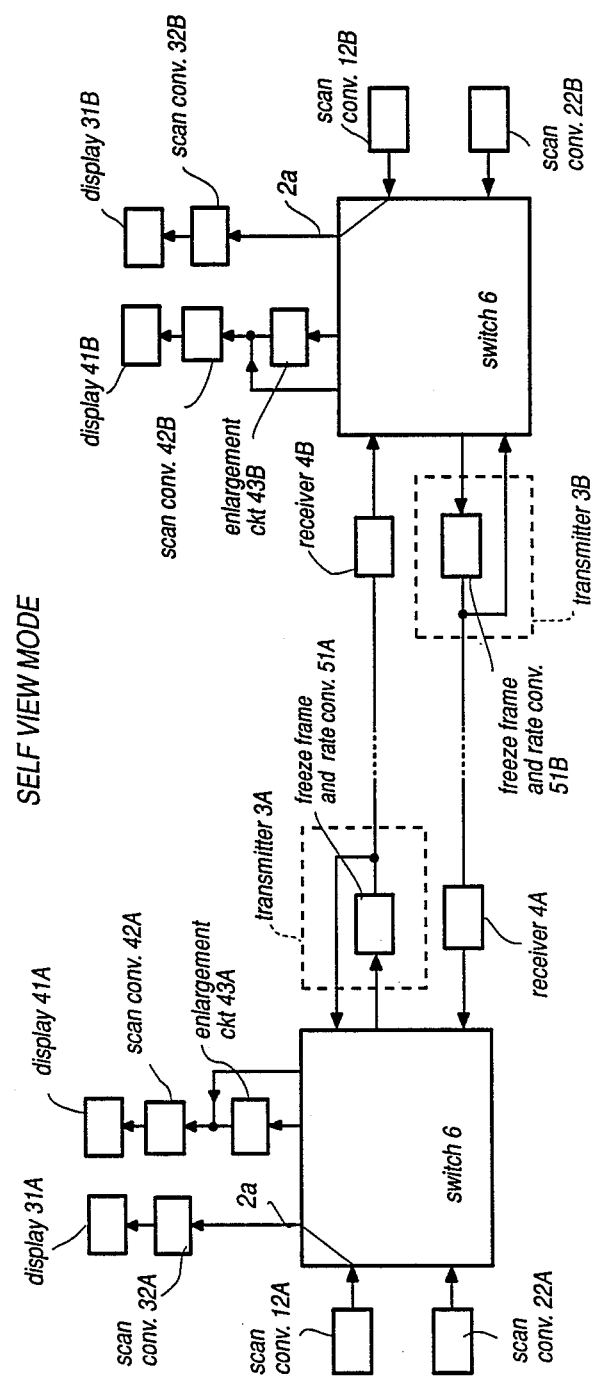
Figure 10B:
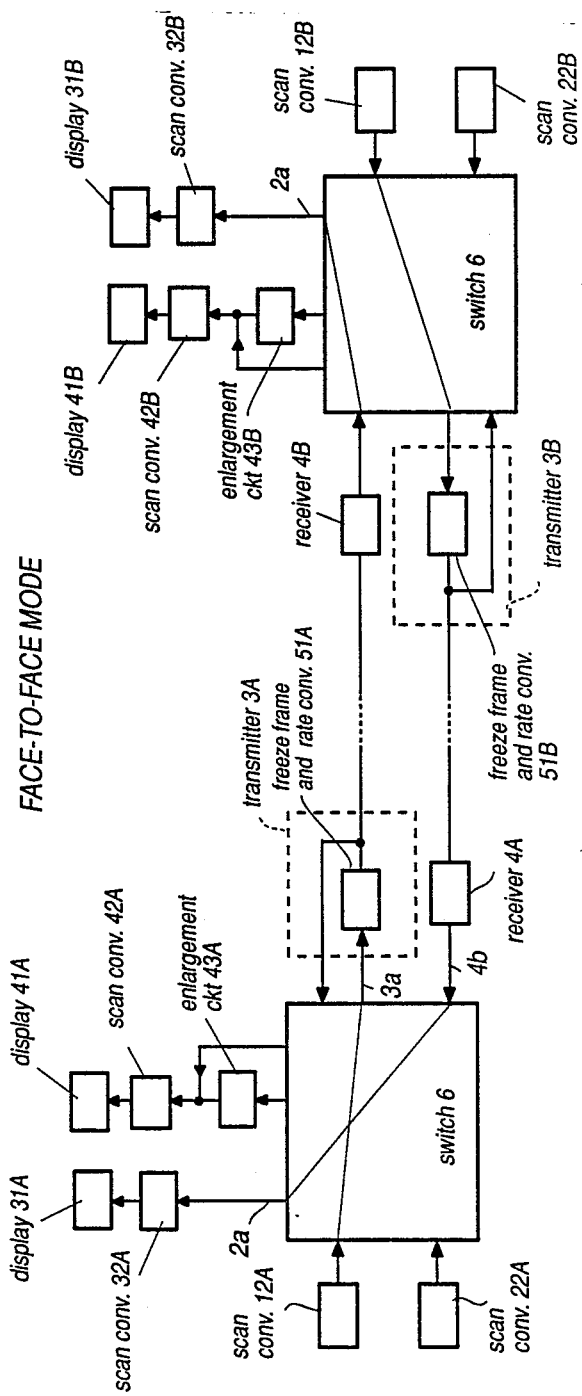
Figure 10D:
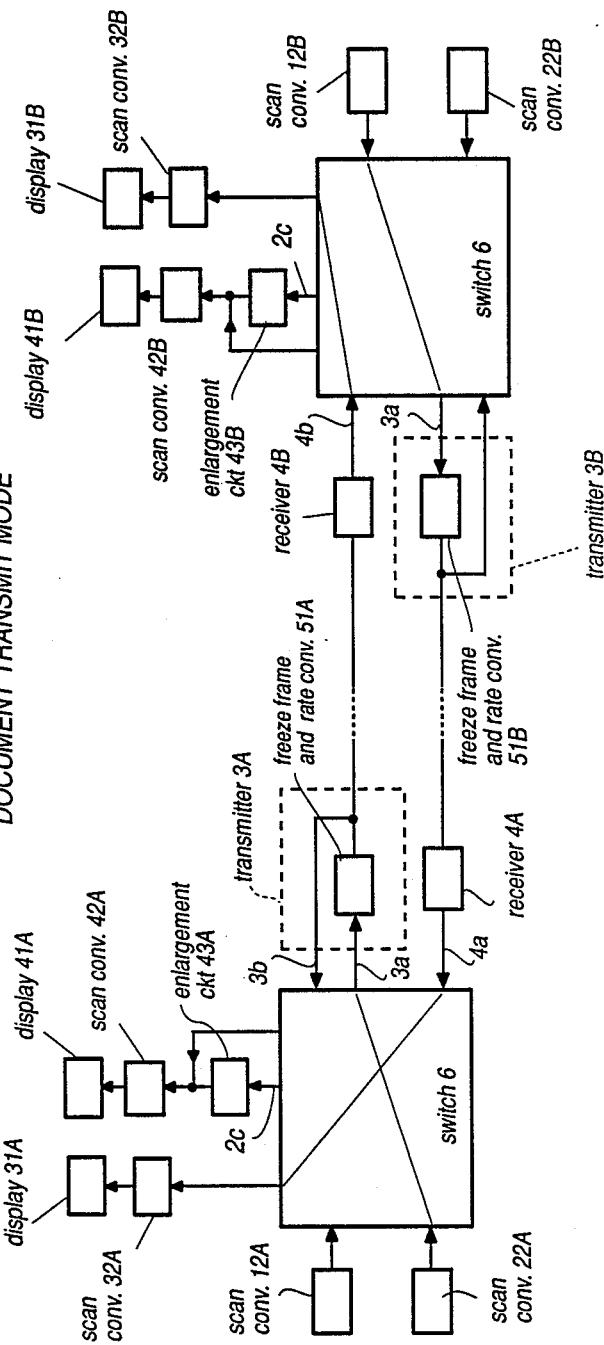

The operation of the switching control logic of the present invention will now be described with reference to FIGS. 10A to 10E. With the "Self View" key 75 being depressed, switch 6A is operated to establish a connection between the scan converter 12 and low resolution display 31 via scan converter 32 to monitor the field of view of the camera 21 before face-to-face communication begins between two parties A and B (see FIG. 10A). Switch 6B is operated simultaneously to connect the output of sync generator 13 of image pickup unit 1 to sync generator 33 of display unit 2 over input line 2e to drive the scan converter 32 at proper timing. With the "Face" key 77 being operated, switch 6A connects the output of scan converter 12A to the input of transmitter 3A as shown in FIG. 10B. A low resolution multiframe signal is transmitted over a transmission line to the other party where the signal is decoded by the header deformatting circuit 64 of the receiver 4. Switching control logic 7 receives a signal from the deformatting circuit indicating whether the received signal is a high or low resolution signal and controls the switches 6A and 6B to establish a connection between the output line 4b of receiver 4 and the input line 2a of display unit 1 to provide a display of the other party on 80×60 pixel display 31 and establish a connection between the output line 4a of receiver 4 and the input line 2e of display unit 2 to synchronize the display sync generator 33 with the timing of the received signal.

When the "Framing" key 76 is operated (see FIG. 10C), the user is allowed to adjust the field of view of the document to be sent while conducting a face-to-face communication with the other party, a process called "framing" just prior to transmission of the document. In this mode, the output of sync generator 13 of the image pickup unit 1 is connected to the transmitter input line 3d to synchronize the transmitter sync generator 53, and the output of scan converter 22 is connected to the input line 2c of display unit 2 to provide a display of the document on 320×240 pixel display 41. When the framing operation is finished and the user depresses the "Document" key 74, the output of scan converter 22 is switched from the display input line 2c to the transmitter input line 3a, and the transmitter output line 3b is switched to the display input line 2c. At the same time, the output line 3c of sync generator 53 is connected to the display input line 2d to synchronize the display 41 with the transmitted signal. This switching operation allows the high resolution signal to be passed through the frame freezing circuit 51 to "freeze" the signal for transmission and permits the user to check the freeze frame of the document. When the "Framing" key is released while leaving the "Document" key 74 operated, the connection between the scan converter 12 and the transmitter input line 3a is disconnected to allow transmission of the freeze frame signal (FIG. 10D) for a period of a few seconds, and the switching control logic 7 supplies a "freeze frame" code via the transmitter input line 3e to the header formatting circuit 54 to insert it into the header of the high resolution signal to be transmitted. On receiving this signal, the header deformatting circuit 64 of the receiving party detects a "freeze frame" code and applies it to the switching control logic 7 through the receiver output line 4c to establish a connection between the receiver output line 4b and the display input line 2c. The data field of the received signal is fed to the frame memory 65 of the receiver to repeatedly read it out of the memory into the large screen display 41 through scan converter 42 until the next signal is arrived. Simultaneously, the receiver output line 4a is connected to the display input line 2d to synchronize the display sync generator 33 with the received signal. On completion of the transmission of a high resolution freeze frame signal, the connection between the scan converter 12 and the transmitter input line 3a is reestablished to resume face-to-face communications. During the transmission of the document, the last frame of the low resolution signal is stored in the scan converter 32 of the receiving end to provide a continuous display of the other party.

Figure 10E:
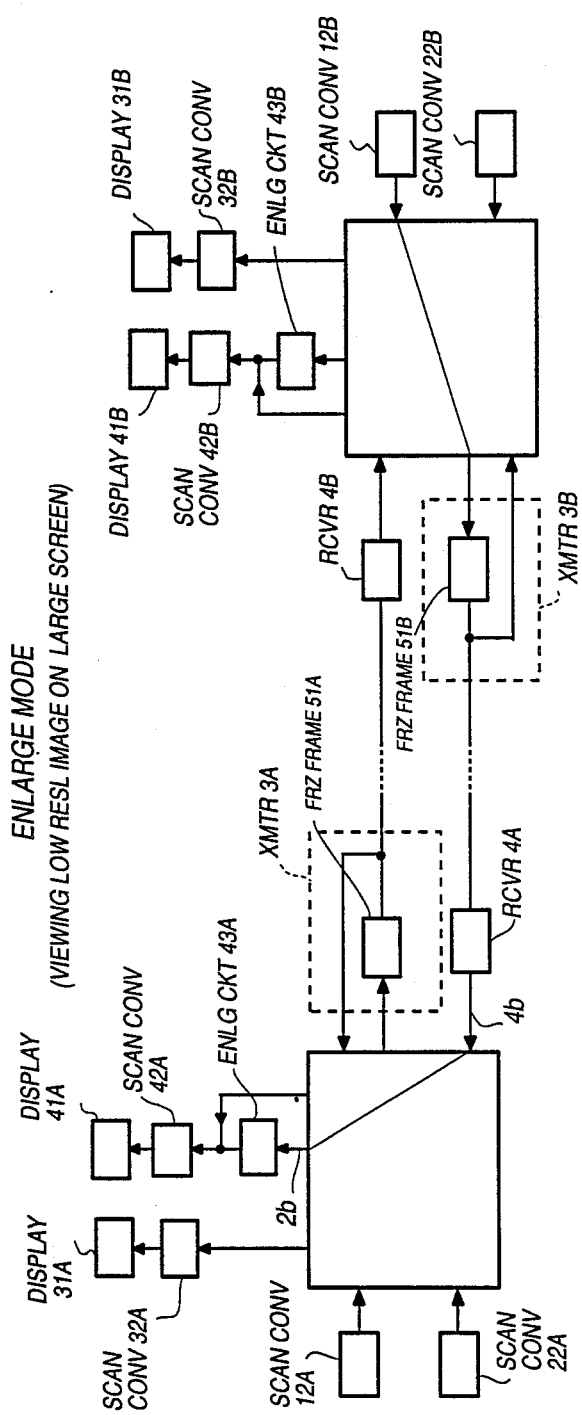

When it is desired to provide a display of a received low resolution multiframe signal on the 320×240 pixel screen 41, the "Enlarge" key 78 is operated during the reception of a low resolution signal. In this mode, the receiver output line 4b is connected to the display input line 2b, as shown in FIG. 10E, and fed to the image enlargement circuit 43 where the 80×60 pixel plane of the signal is enlarged to fit in with the 320×240 pixel plane of the display 41.

Figure 11:
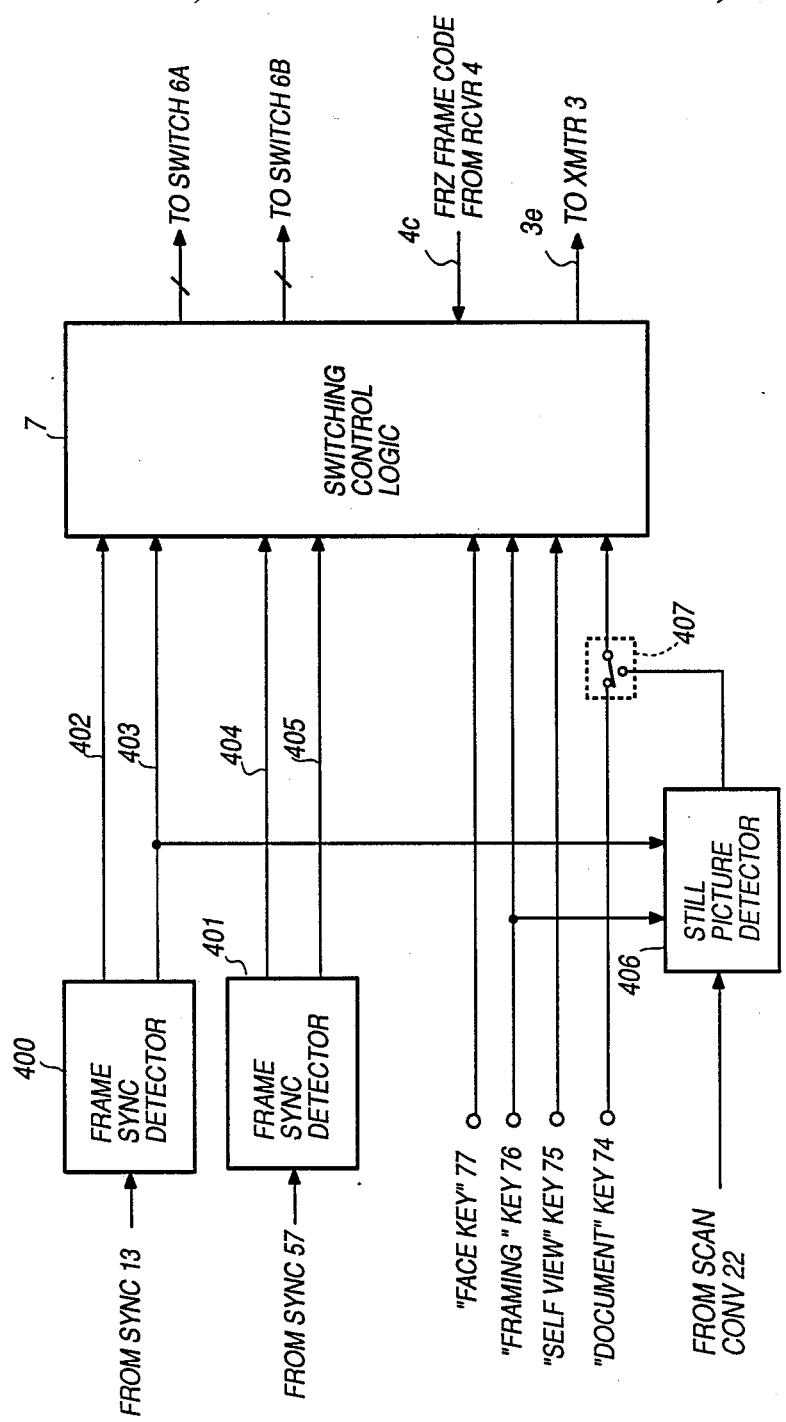
FIG. 11 is a block diagram of a modified embodiment of the invention.

FIG. 11 is an illustration of a preferred form of the switching control logic 7. A frame sync detector 400 is provided to receive an output signal from the sync generator 13 of the image pickup unit 1 to detect a frame sync and supplies switch timing signals respectively for low and high resolution signals to the switching control logic 7 through respective lines 402 and 403. Likewise, a frame sync detector 401 receives the output of sync generator 57 of the receiver 4 to detect a frame sync and supplies switch timing signals for low and high resolution signals to the control logic 7 through lines 404, 405. These switch timing signals are used to generate the switching control signals during a period between successive frames to prevent truncation of a frame to be displayed. Further included is a still picture detector 406 which receives the output of scan converter 22 of the image pickup unit 1 and the signal on high resolution frame timing lead 403. The still motion detector is enabled in response to a signal from the "Framing" key 76 to detect when the high resolution signal contains very small amounts of moving elements indicating that a framing operation is complete and notifies this fact to the logic 7 instead of the signal from the "Document" key 74 through a manual-to-auto select switch 407. This triggers the switching control logic 7 to generate a control signal to automatically switch the operation from a document framing mode to a "document" mode.

Figure 12:
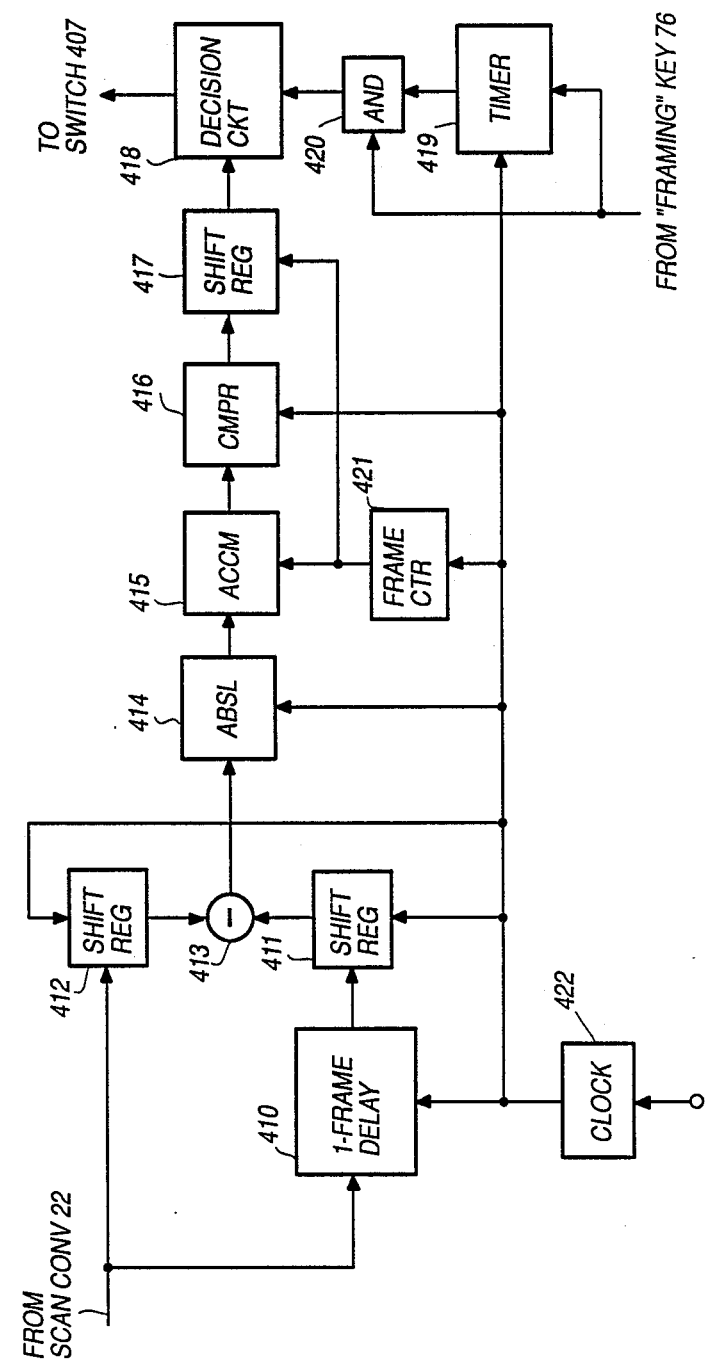
FIG. 12 is a block diagram of the still picture detector of FIG. 11.

Details of the still motion detector 406 are illustrated in FIG. 12. Detector 406 includes a 1-frame delay 410 by which the high resolution signal is delayed a one-frame period and fed to a 4-bit shift register 411. The input signal from converter 22 is also supplied to a 4-bit shift register 412. A subtractor 413 compares the 4-bit outputs of shift registers 411 and 412 and generates a difference signal at each pixel cycle with a positive or negative sign bit and feeds an absolute value circuit 414 where the negative values of the difference are converted to positive values. The absolute value of difference is integrated by an accumulator 415 over a frame interval determined by successive pulses generated by a frame counter 421 which counts pixel clock pulses from a clock generator 422. Thus, a total of differences between successive frames can be derived from the output of accumulator 415 and is fed to a comparator 416 for comparison with a prescribed value which represents the level of background noise which exists in motionless frames. Comparator 416 produces a logic 1 when the total difference exceeds the noise level or a logic 0 when it falls below the noise level. A 64-bit shift register 417, which is reset by the output of frame counter 421, is connected to the output of the comparator 416 to store successive interframe differences over the period of 64 frames. The output of comparator 417 is fed to a decision circuit 418 which is enabled in response to a signal from an AND gate 420. A timing circuit 419 initiates counting clock pulses in response to a signal supplied from the "Framing" key 76 and generates an enable pulse of a predetermined duration. This enable pulse is fed to the AND gate 420 to which the signal from the "Framing" key 76 is also applied. A simultaneous presence of the two inputs to AND gate 420, the decision circuit 418 is enabled to compare the serial bit pattern of the output of comparator 417 with a bit pattern which occurs when successive frames become motionless and supplies an output to the switching control logic 7 when a match is detected between them.

Figure 13:
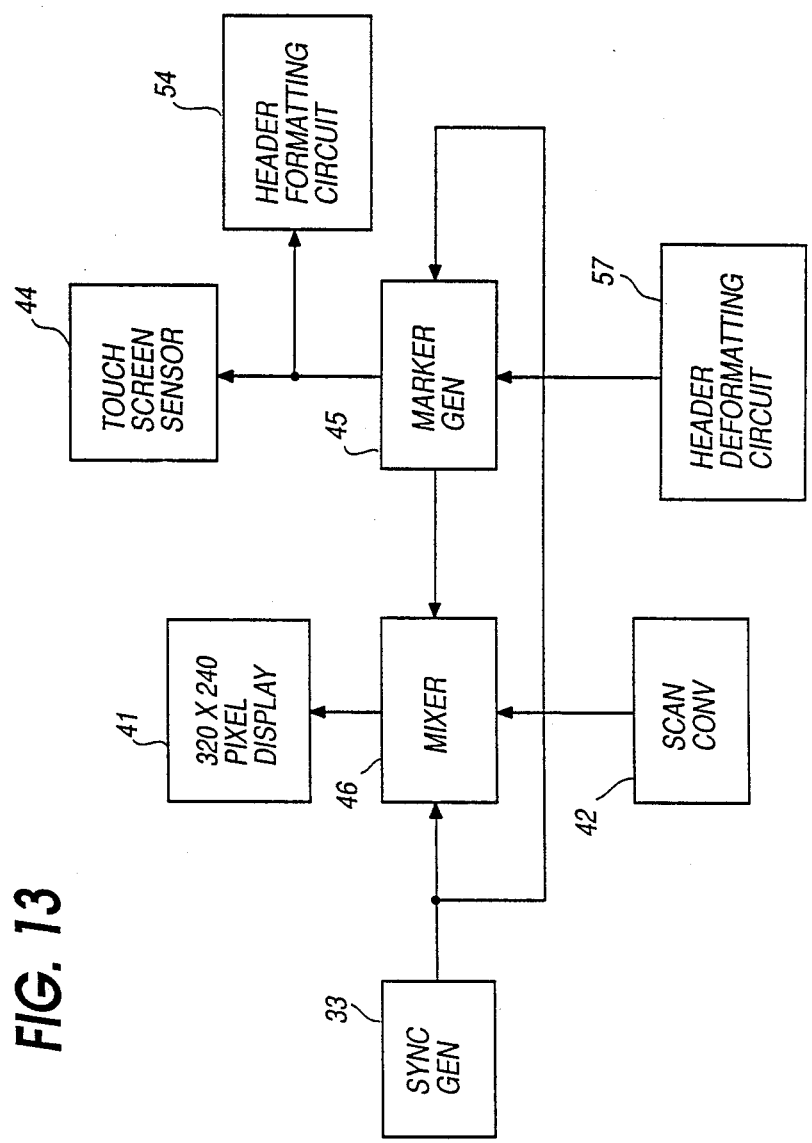
FIG. 13 is a block diagram of a pointing arrangement.

During document transmission modes it is convenient for communicators to use a pointer in a displayed view for pointing where one wants to attract the attention of the other party. Such a pointing arrangement is shown in FIG. 13. The pointing arrangement includes a screen touch sensor 44 of any conventional design. This sensor is laid over the screen of the display 41 to generate a signal indicating the location of a finger or any pointing device on the screen by XY coordinates. The coordinate indicating pointing signal is sent to the header formatting circuit 54 to cause it to be inserted to the header field of the transmitted high resolution freeze frame signal. A marker generator 45 is connected to receive the pointing signal to generate a pointer mark in the form of an arrow, for example, this being fed to a mixer 46 and mixed with frame signals from the display scan converter 42 and fed to the 320×240 pixel display 41. Marker generator 45 further receives inputs from the header deformatting circuit 57 to produce a pointer on a received image. The pointer can be made to appear on a real time basis during the period of document transmission by establishing periodic time slots in the transmitted data and inserting the coordinate position signal to the time slots.

Figure 14:
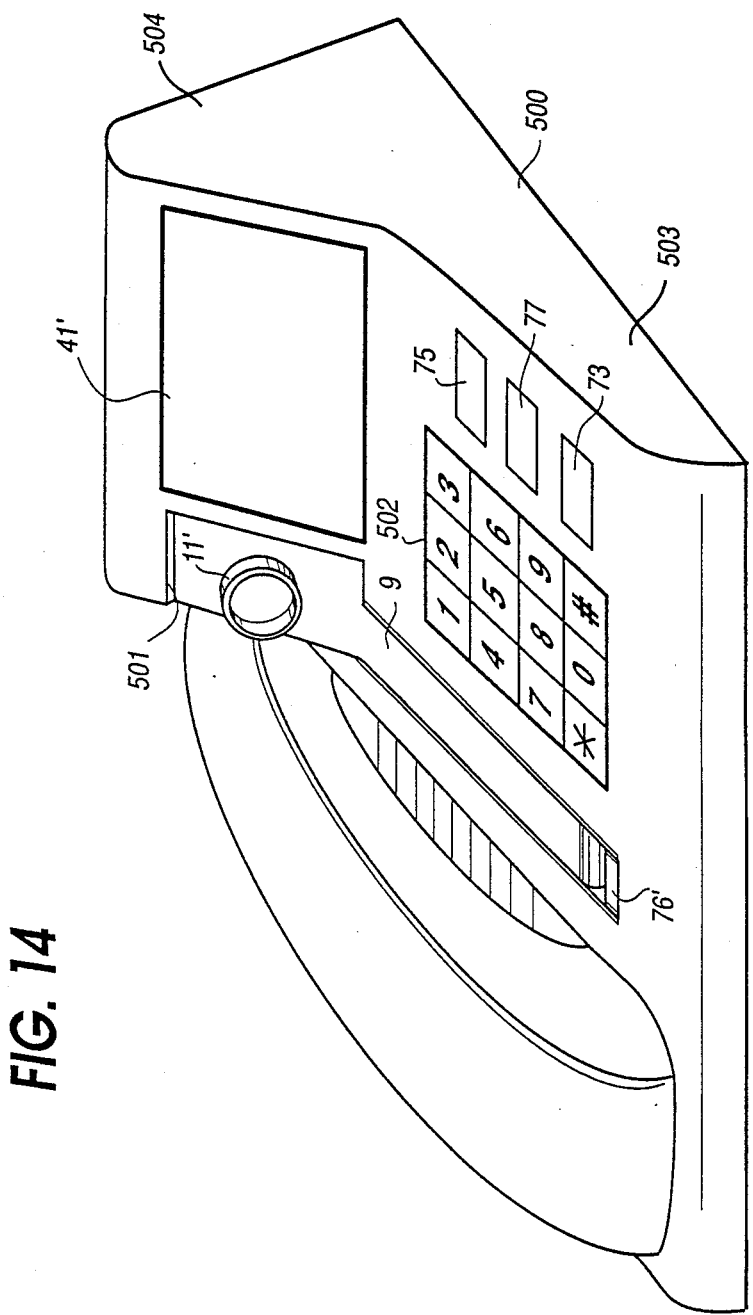
FIGS. 14 and 15 are perspective views of a videotelephone set according to a second embodiment of the invention.
Figure 15:
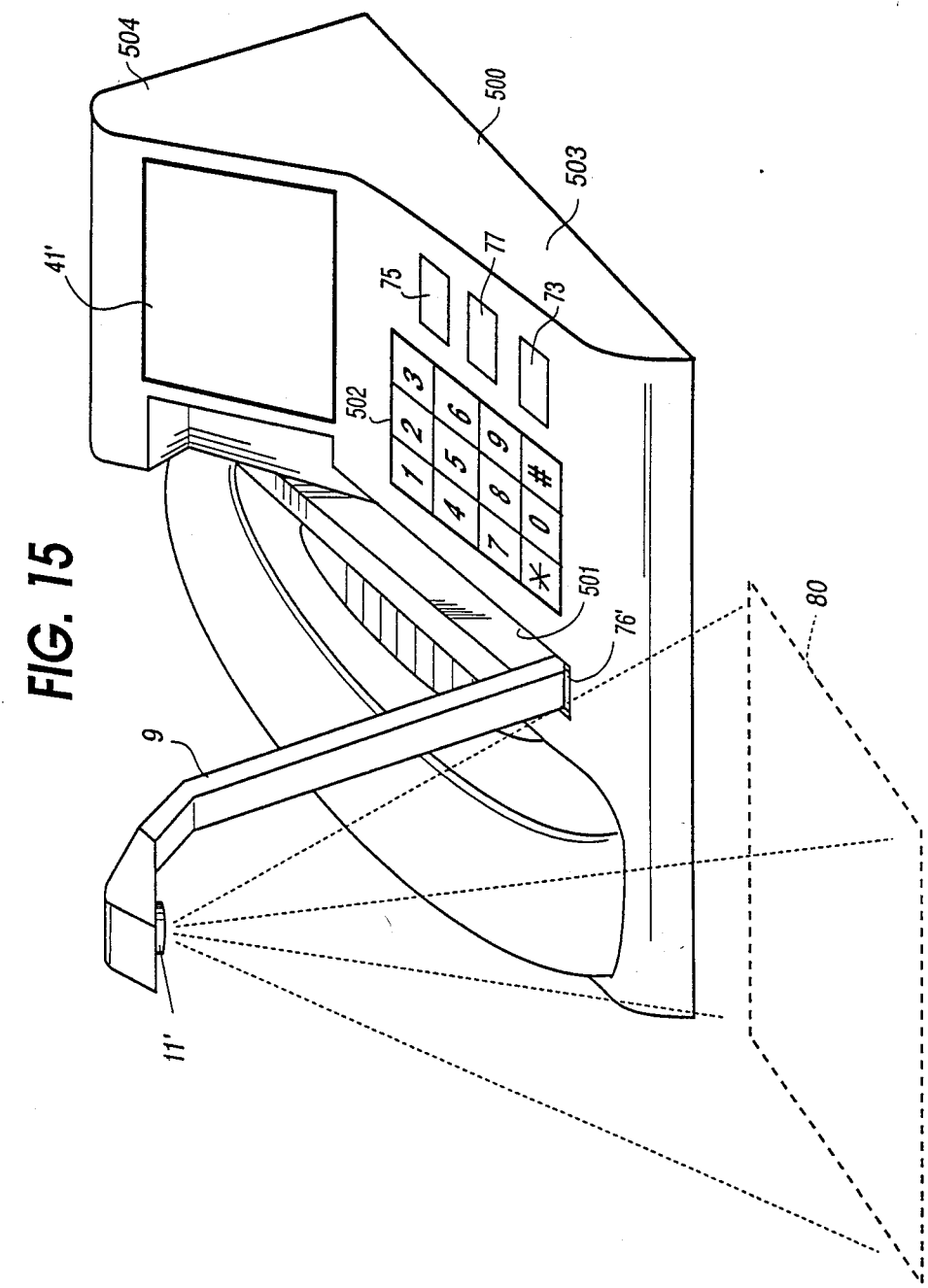

A second embodiment of the present invention is illustrated in FIG. 14. In this embodiment, a single camera 11' and a single display 41' are used instead of two cameras and two displays of the first embodiment. The 320×240 pixel display 41' is a flat liquid crystal display and is located on an upper rear portion 504 of the housing 500 positioned at a distance appropriate for viewing. A numeric key pad 502 is located on a lower front portion 503 of the housing which is easily accessible by the user. Camera 11' is a two-dimensional CCD (charge coupled device) element and is mounted on the upper end portion of an arm 9. Arm 9 is hinged at the lower end thereof and normally rests in a slot 501 formed in the apparatus housing 500. In this rest position, the camera 11' is located adjacent the display 41' and pointed slightly upward to bring the viewer's face into the field of view. A switch 76' is provided instead of the "Framing" key 76. This switch is located at the lower end of the slot 501. When the hinged arm 9 is manually pulled forward to an upright position as shown in FIG. 15, the camera 11' is pointed downward to bring the document 80 into the field of view. When this occurs, the lower end of the arm comes into pressure contact with the switch 76', closing its circuit to generate a "framing" command signal.

Figure 16:
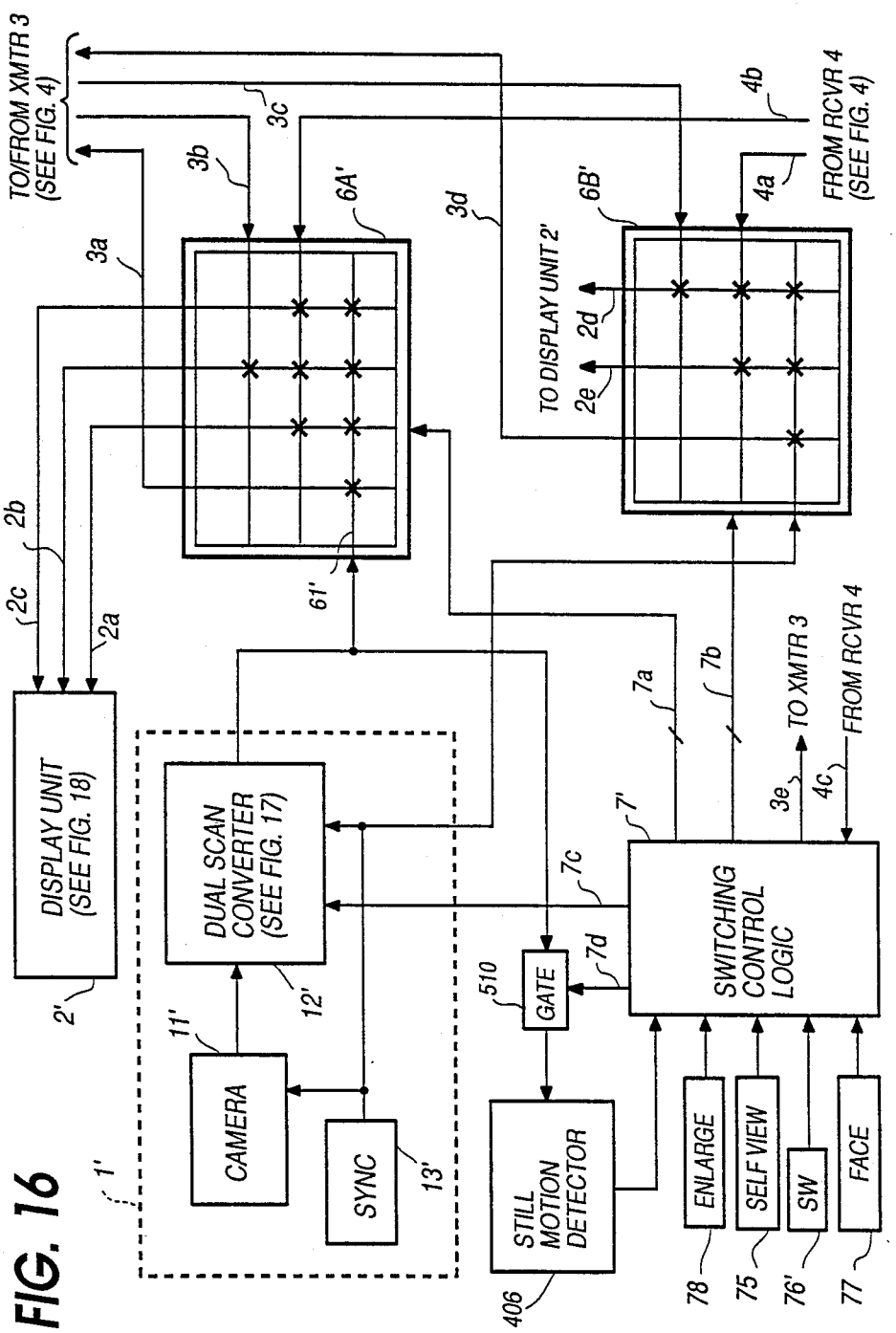
FIG. 16 is a block diagram of the second embodiment.

As shown in FIG. 16, the image pickup unit 1' of the second embodiment includes a dual scan converter 12' which combines the functions of the scan converter 12 and scan converter 22 of the first embodiment. Dual scan converter 12' has its output connected to the first low 61' of switch 6A' and receives a switching control signal on lead 7c from the switching control logic 7'. The still picture detector 406 of FIG. 12 is employed instead of the "Document" key 74 of the previous embodiment. Still picture detector 406 is connected to the output of the converter 12' through a gate 510 to detect a freeze frame and supplies an output signal to switching control logic 7' to automatically switch from document framing mode to the "document" mode.

Figure 17:
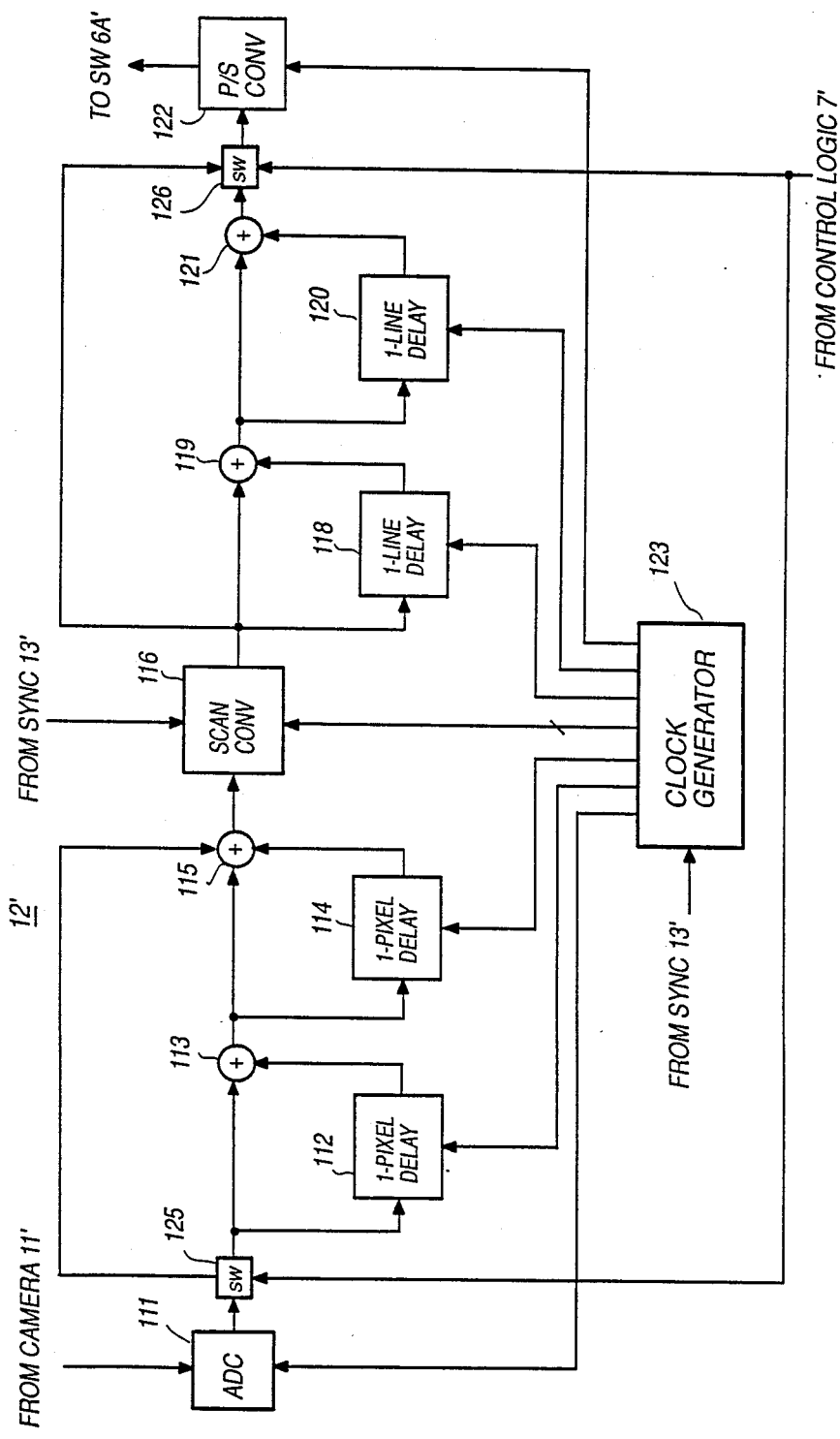
FIG. 17 is a block diagram of the dual scan conversion circuit of FIG. 16.

As illustrated in FIG. 17, the dual scan converter 12' is generally similar to the scan converter 12 of FIG. 5 with the exception that it further includes switches 125 and 126. The switching control signal from switching control logic 7' is applied to switches 125 and 126 for selectively coupling the output of A/D converter 111 to the input of 1-pixel delay 112 and an input of adder 115 and for selectively coupling the input of parallel-to-serial converter 122 to the output of adder 121 and the output of scan converter 116. The low resolution (80×60)-pixel signal is generated when the output of A/D converter 111 is switched to the delay 112 and the input of parallel-to-serial converter 122 is switched to the output of adder 121. The high resolution (320×240)-pixel signal is generated when the output of A/D converter 111 is connected through switch 125 to the adder 115 and the input of parallel-to-serial converter 122 is connected to the output of scan converter 116. In FIG. 18, the display 41' is connected to the outputs of scan converters 32 and 42.

Figure 19A:
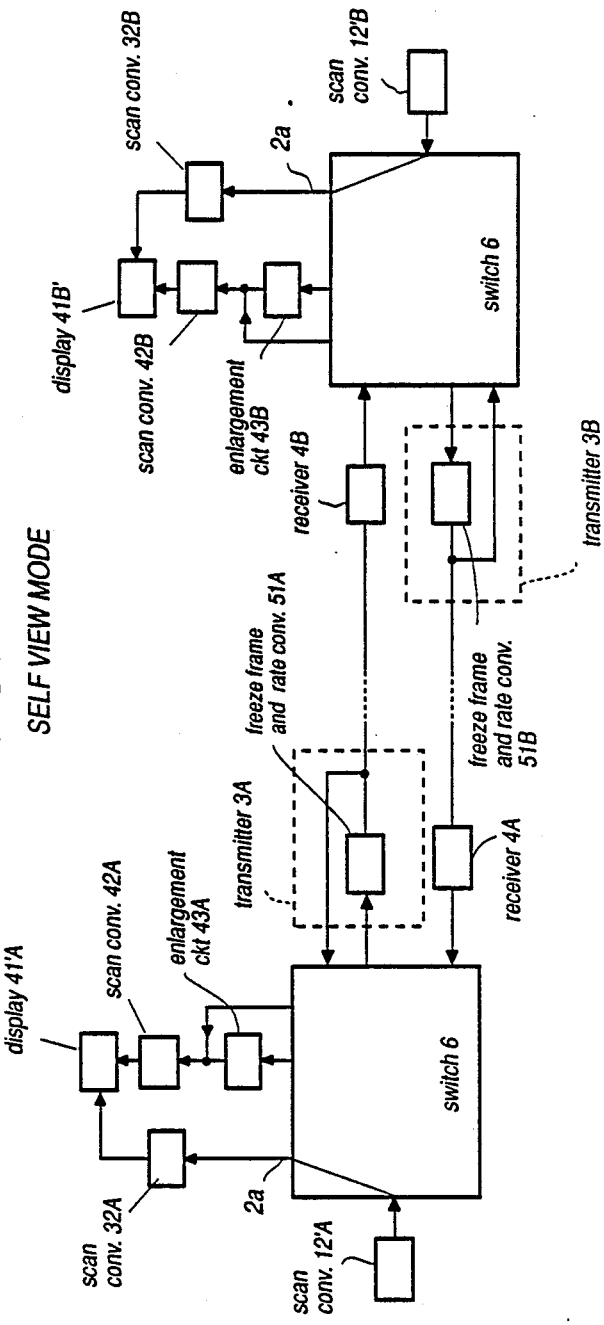
Figure 19C:
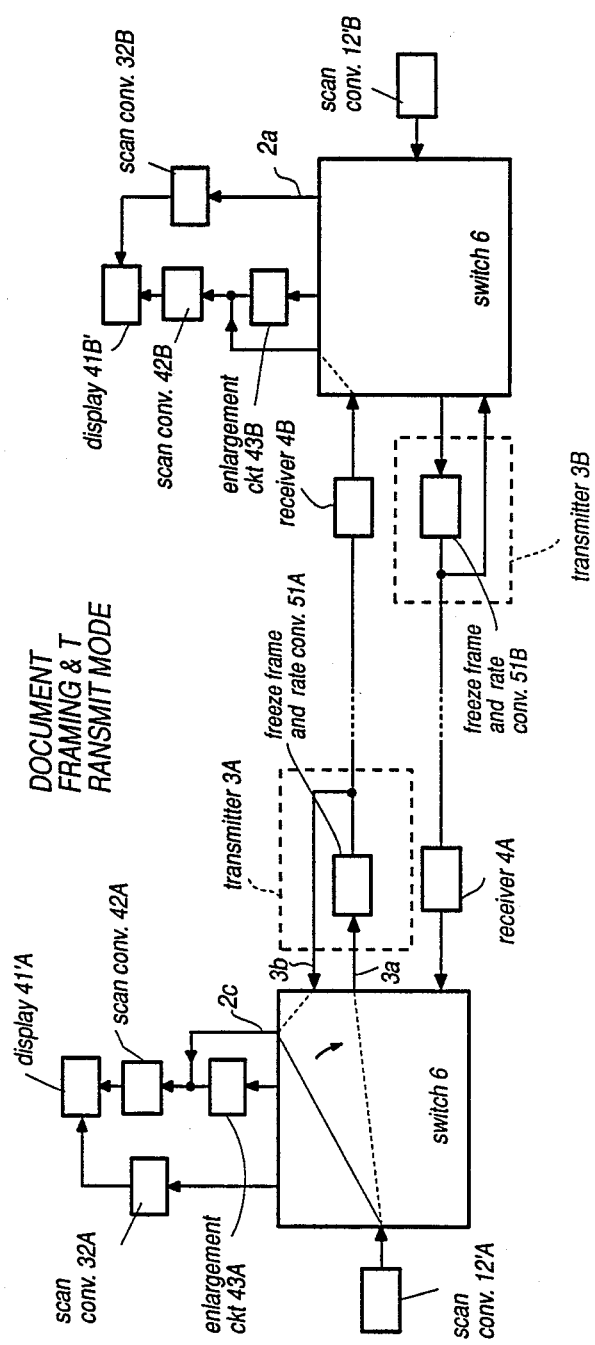

The operational modes of the second embodiment, as visualized in FIGS. 19A to 19E, are generally similar to those of the first embodiment. During the self viewing mode (FIG. 19A), the output of dual scan converter 12' is connected to the display input line 2a to provide display of low resolution self image on an 80×60 pixel area of the 320×240 pixel display 41'. During the "face" mode (FIG. 19B), the output of converter 12' is connected to the transmitter input line 3a to transmit a low resolution signal to the other party and a received low resolution signal is coupled through the receiver output line 4b to the display input line 2a to provide display of the received 80×60 pixel image on the 80×60 pixel plane of the display 41'. Document framing mode (FIG. 19C) is initiated when the arm 9 is pulled away from the housing 500, closing the contacts of a switch 76' corresponding to the "Framing" key 76 of the previous embodiment. During this mode, switching control logic 7' applies a logic 1 through line 7d to the gate 510 to pass the output of converter 12' to still picture detector 406. The output of converter 12' is supplied to the display input line 2c through switch 6A'. When the detector 406 (FIG. 16) detects a freeze frame, the switching control logic 7' responds to it by switching the output of converter 12' to the transmitter input line 3a and connecting the output of the freeze frame and rate conversion circuit 51 to the display input line 2c to display the freeze frame picture on the full 320×240 pixel plane of the display 41', allowing the user to monitor the transmitted version of the document, while automatically switching the system to "document" mode. When the arm 9 is returned to the rest position, the contacts of switch 76' are opened, terminating the document transmit mode. Image enlarge mode can also be performed for enlarging the 80×60 pixel image of a received low resolution signal of the full 320×240 pixel plane of the display 41' by coupling the receiver output line 4b to the display input line 2b (FIG. 19D). A superimpose mode can be effected by sequentially transmitting low and high resolution signals. At the receiving end the 80×60 pixel frame of the low resolution signal is superimposed on the 320×240 pixel image of the high resolution signal.

Figure 20:
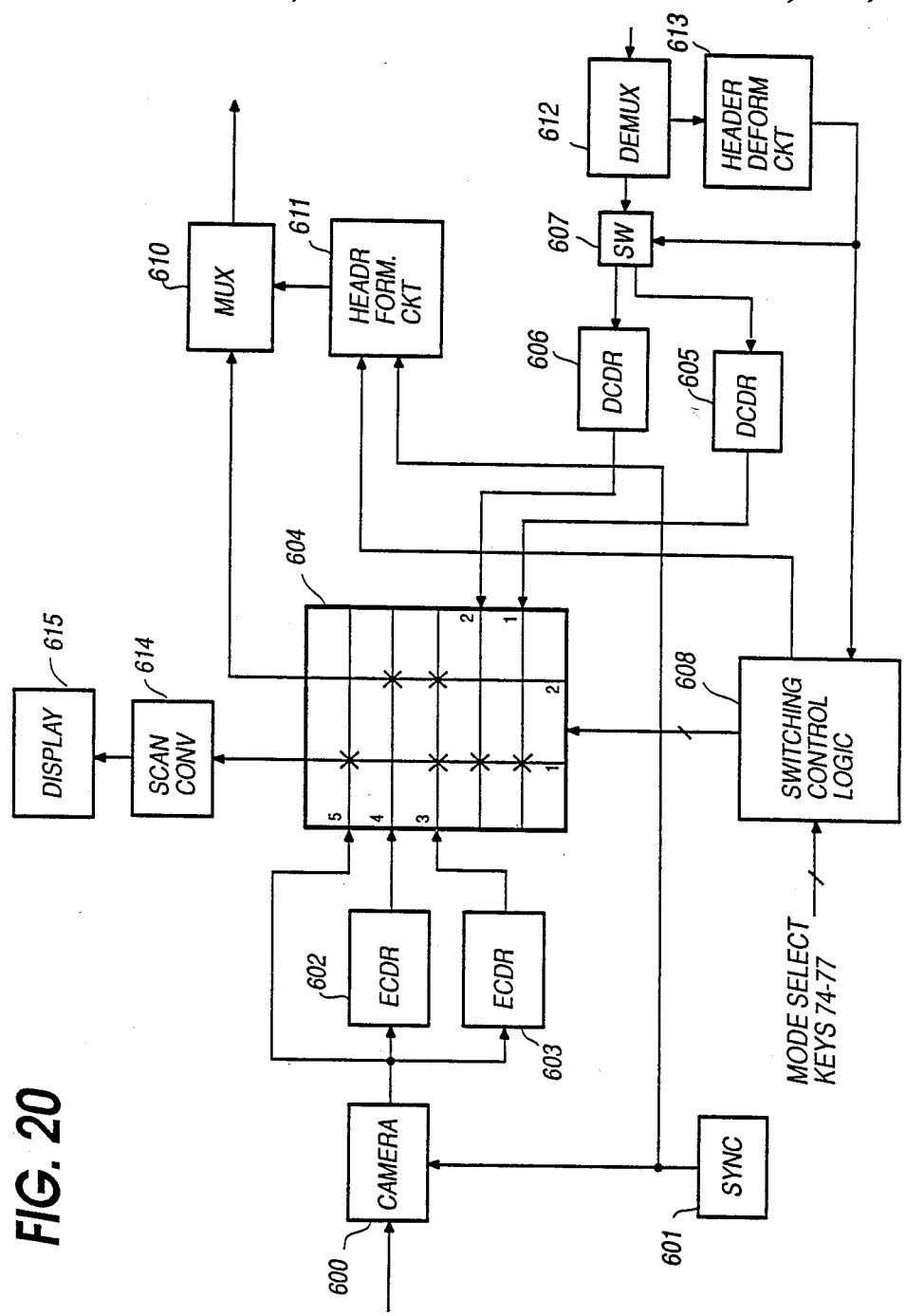
FIG. 20 is a block diagram of a third embodiment of the invention.

FIG. 20 is an illustration of a third embodiment of the present invention. In this embodiment, data compression techniques are employed instead of the resolution and scan conversion techniques of the previous embodiments. This embodiment is provided with a single video camera 600 which is synchronized with timing signals from a sync generator 601. The output of camera 600 is coupled to coding circuits 602 and 603 and the fifth row of a matrix switch 604, the outputs of the coding circuits 602 and 603 being connected to the third and fourth rows of the switch 604. To the first and second rows of the switch 604 are connected the outputs of decoding circuits 605 and 606, respectively. Signals received from the distant end of the line are applied to and demultiplexed by a demultiplexer 612, the output of which is connected selectively to the inputs of decoding circuits 605 and 606 through a switch 607. A header contained in the demultiplexed signal is examined by a header deformatting circuit 613 which provides a control signal to a switching control logic 608 to notify it of the type of signal received. Matrix switch 604 is controlled by the switching control logic 608 in response to manual commands as well as to the output of the header deformatting circuit 613.

The first column of matrix switch 604 is connected to a scan converter 614 whose output is connected to a 320×240 pixel display 615. The second column of the switch 604 is connected to a multiplexer 610. A header formatting circuit 611 is associated with the multiplexer 610 and the switching control logic 608 to insert a header into the signal to be transmitted.

Coding circuits 602 and 603 are designed to implement bit truncation coding or vector quantization coding algorithm. Coding circuit 603 performs data compression coding on the output of the camera 600 to generate a high resolution, low frame rate video signal and coding circuit 602 performs different data compression coding and generates a low resolution, high frame rate video signal. Decoding circuit 605 performs data expansion decoding on a received low resolution, high frame rate signal from the output of demultiplexer 612 and decoding circuit 606 performs different data expansion decoding on a received high resolution, low frame rate signal. Switch 607 is operated in response to a signal from the logic 608 to appropriately couple the output of demultiplexer 612 to the decoding circuits 605 and 606.

Figure 21:
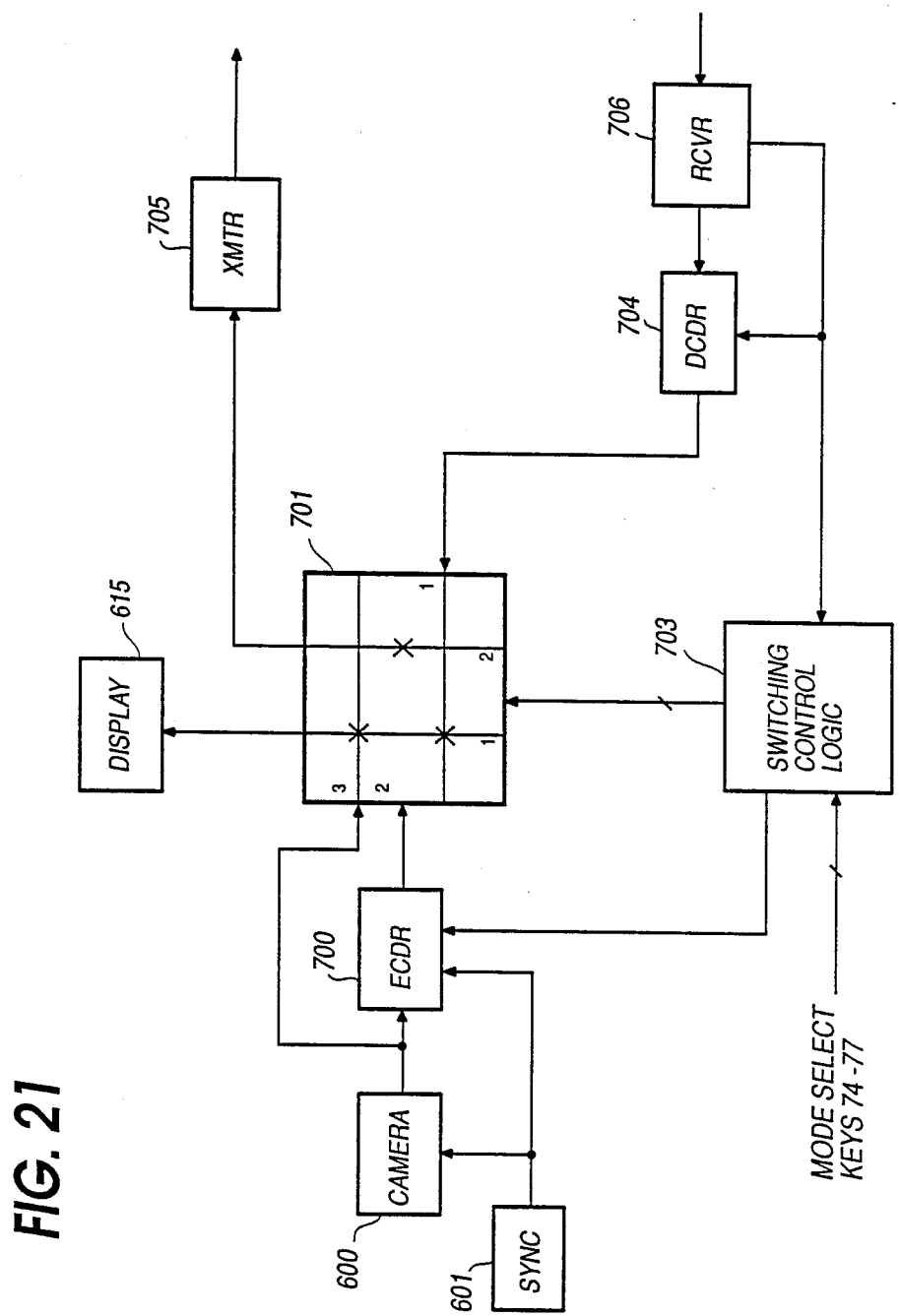
FIG. 21 is a block diagram of a fourth embodiment of the invention.

A modified form of the embodiment of FIG. 20 is shown in FIG. 21. In this modification, a single coding circuit 700 is provided instead of the two coding circuits 602 and 603 of FIG. 20 and a single decoding circuit 704 is used instead of the two decoding circuits of the previous embodiment. The output of coding circuit 700 is connected to the second row of matrix switch 701 and the output of camera 600 is connected to the third row of the switch 701. The first column of switch 701 is connected directly to the display 615 and the second column of the switch is connected to a transmitter 705. Decoding circuit 704 is connected to the output of a receiver 706 and supplies a decoded signal to the first row of the switch 701 and a control signal to a switching control logic 703. Matrix switch 701 connects the decoded signal to the display 615 and switches the camera output to the display 615 and the output of coding circuit 700 to the transmitter 705 in response to a switching signal from the control logic 703.

Figure 22:
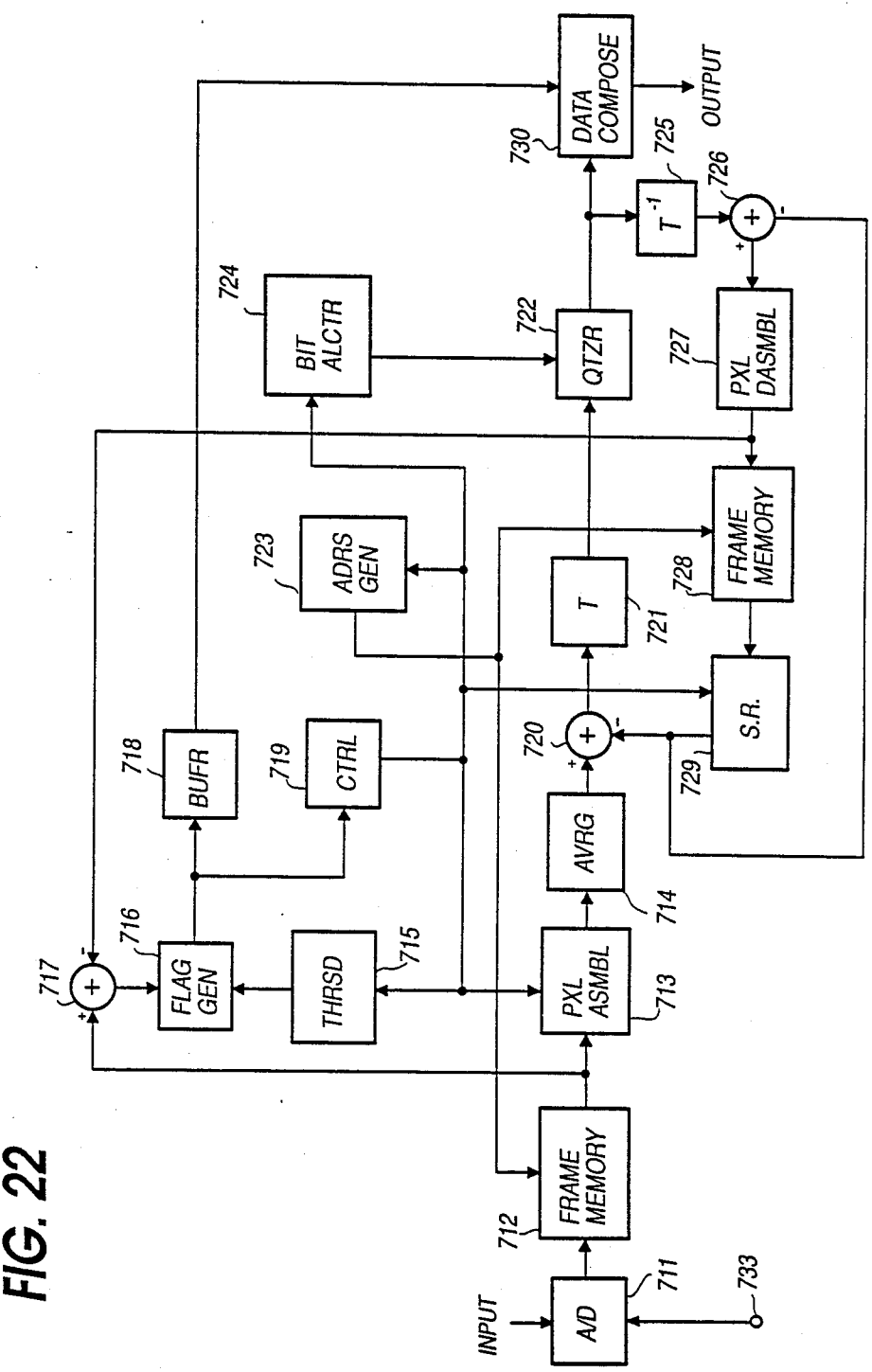
FIG. 22 is a block diagram of the coding circuit of FIG. 21.

As shown in FIG. 22, the coding circuit 700 comprises an A/D converter 711, a video memory 712 connected thereto for storing a frame of the digital form of the original camera output at prescribed intervals, typically at two to five frames per second to generate a low resolution video signal or at 0.2 to 0.5 frames per second to produce a high resolution video signal. A 4-bit shift register, or pixel assembly circuit 713 is connected to the output of memory 712 to produce a series of consecutive four pixels. An averaging circuit 714 is connected to the output of the pixel shift register 713 to produce a signal indicating an average value of each set of four pixels. The output of averaging circuit 714 is fed to a first input of a comparator 720. The contents of a frame memory 728 have been cleared before the processing of a first layer of hierarchical coding algorithm. (Details of the hierarchical coding is described in K. D. Baker and G. D. Sullivan "Multiple Bandpass Filters in Image Processing", Proceedings of I.E.E. Vol. 127, pages 173–184, 1980, P. J. Burt, "Fast Fourier Transforms for Image Processing", Computer Graphics, Image Processing, Vol. 16, pages 20–51, 1981, Tanimoto, S.L. "Image Transmission with Gross Information First", Computer Graphics and Image Processing, Vol. 9, page 72, 1979; Tanimoto, S. L., "A Hierarchical Data Structure for Picture Processing", Computer Graphics and Image Processing, Vol. 4, page 104, 1975; Y. Yasuda, M. Takagi, and T. Awano, "Hierarchical Coding of Still Images", in Proceedings on Picture Coding Symposium, Jul. 1979, page 32; and K. Knowlton, "Progressive Transmission of Grey-Scale and Binary Pictures By Simple, Efficient, and Lossless Encoding Schemes," Proc. IEEE, Vol., 69, pages 885–896, Jul. 1980). Thus, the second input of the comparator 720 is at logic zero at this moment and hence the average value at the first input of the comparator is passed without alteration to an orthogonal encoder 721 whose output is coupled to a quantizer 722 where the orthogonal coded signal is quantized and applied to an inverse converter 725 where the average value of the original four pixels is recovered. It is noted that some error exists in the average value as a result of the data compression associated with the orthogonal coding (Hadamard coding algorithm) performed by the orthogonal encoder 721 and quantizer 722. The use of an orthogonal encoder having a high data compression rate and a transfer function which generates small errors is preferred. The output of the inverse converter 725 is applied to a pixel disassembly circuit 727 where the original four pixels are recovered and stored into the frame memory 728. The contents of the frame memory 728 correspond to an image to be reconstructed at the receiving end of the system at each level of the hierarchical coding.

On the other hand, the output of the pixel disassembly circuit 727 and the output of the memory 712 are compared against each other by a comparator 717 and the difference between them is compared by a flag generator 716 with a threshold provided from a threshold generator 715. A logic 1, or flag "1", is generated by the flag generator 716 when the output of comparator 717 is greater than the threshold value and a logic 0, or flag "0", is generated if the threshold is not exceeded. The output of flag generator 716 is stored in a buffer 718 and supplied to a data composer 730 where it is combined with the output of the quantizer 722 on a per block basis. A controller 719 is connected to the output of the flag generator 716 to generate timing signals including the clock pulse necessary for addressing the memories 712, 728, and address cycle pulses synchronized with pixel processing cycles at each layer of the hierarchical coding, and layer indicating pulses for indicating the boundaries between layers. An address generator 723 is provided to generate address data for each pixel on the storage plane of the memories 712 and 728. a bit allocation circuit 724 is provided to allocate the most efficient coding value to each level of the video data.

When a coding process is performed on a 256×256 pixel plane on the first layer of the hierarchical coding algorithm, a similar coding process is performed on a newly obtained 128×128 pixel plane. On completion of a series of eight repetitions of the process, the original picture is represented by one pixel which is the average luminance of the frame. The information obtained at the eighth layer of the coding hierarchy is 4-bit data for transmission. The transmission of data on each layer is effected by the data composer 730 in a sequence opposite to the order of layers in the data composer 730 such that the most coarse data (the eighth layer) is transmitted first and the first layer last. The receiving end of the system performs inverse orthogonal transformation on a received signal the eighth layer first and the first layer last, composes pixels and writes them into frame memory. By reading the frame memory at a rate higher than the write rate, an image having a stepwisely higher resolution can be obtained.

The hierarchical coding algorithm described above can be said to be a process in which plural spatial frequency filters of different levels of coarseness are assigned to the pixel plane of each frame to be transmitted and the differentials of the layered frames (eight layers in the illustrated embodiment derived from the original signal through such filters) are efficiently encoded using frame correlation technique and transmitted to the receiving end.

In a practical aspect of the invention, the A/D converter 711 is sampled at a high sampling rate for low resolution images and at a low sampling rate for high resolution images. With regard to the spatial frequency filters, coarse spatial frequency filters are used for low resolution images and fine spatial frequency filters for high resolution images. With a 2-bit per pixel coding on a 64-kbps transmission line, for example, a low resolution image (128×128 pixels) can be obtained with a rate of two frames per second and a high resolution image (256×256 pixels) can be obtained with a rate of 0.5 frames per second.

The switching of the spatial frequency filters can be achieved by discarding lower layers. If the eight layers are divided into three time intervals such that the eighth to fourth layers belong to the first time interval, the third and second layers belong to the second time interval and the first layer belong to the third time interval, a low resolution image is obtained by terminating the transmission at the end of the second time interval and proceeding with the transmission of the next frame.

Alternatively, instead of dividing the spatial frequency filters into different layers, image data is transmitted for an interval of 0.5 second in the case of 2 frames per second transmission before proceeding with the transmission of the next frame. Since the amount of information to be transmitted varies significantly depending on the textures of the image, the hierarchical coding technique allows highly efficient transmission of signals and eliminates layer control and permits the encoder to be used for processing both high and low resolution signals.

The switching between high and low resolution transmissions can be effected by the application of a logic 1 or logic 0 through an input terminal 733 to the A/D converter 711 in response to a manual command entered through a switch on the apparatus housing. In response to a logic 0 input from the terminal 733, the A/D converter 711 generates a 4-bit output which represents one of 16 gradations and in response to a logic 1 input the converter generates a logic 0 output for 0 to 8 levels of gradation and a logic 1 output for 9 to 16 levels of gradation.

Figure 23:
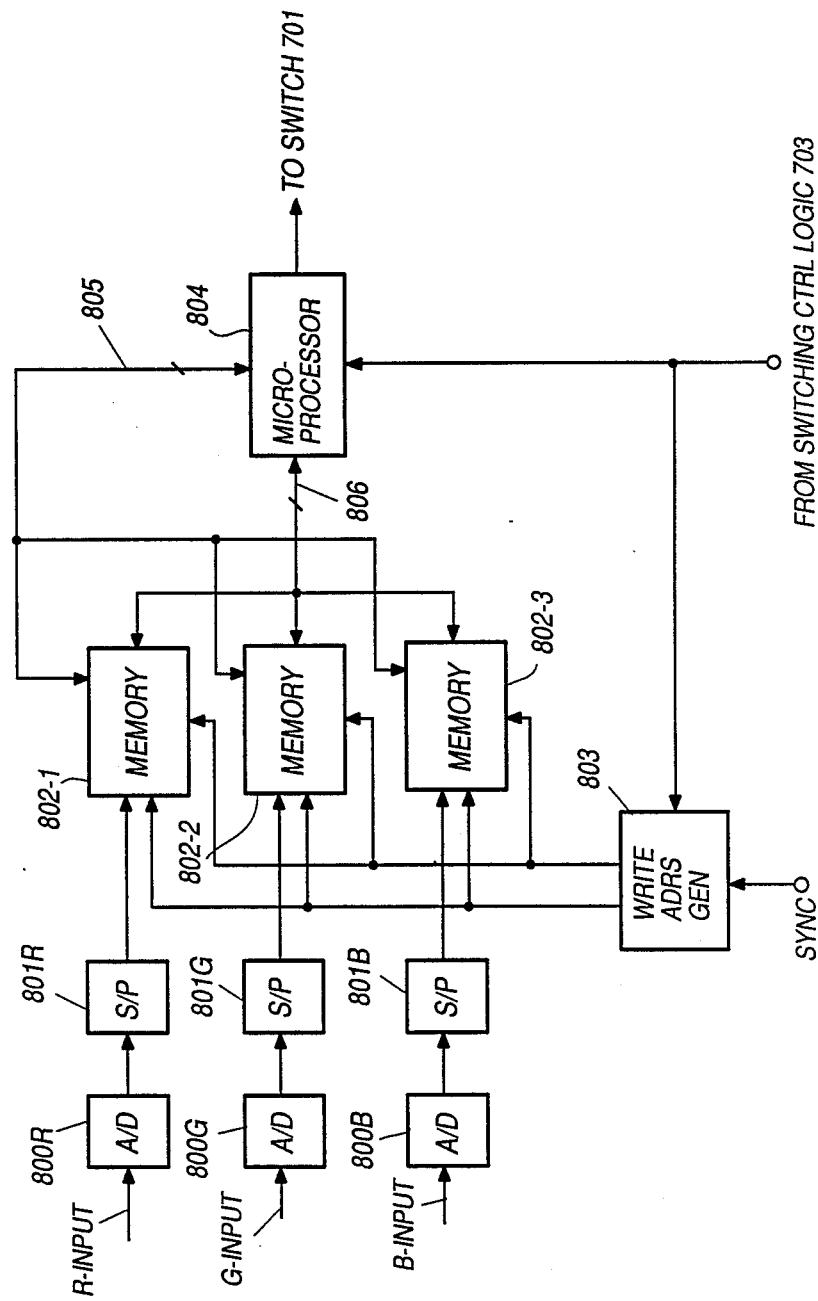
FIG. 23 is a block diagram of another form of the coding circuit of FIG. 21.

An alternative embodiment of the coding circuit 700 is illustrated in FIG. 23. In this embodiment, the input to the coder 700 is RGB color signals which are respectively fed to A/D converters 800R, 800G, 800B and converted to parallel form by serial-to-parallel converters 801R, 801G, 801B and fed to dual port memories 802-1, 802-2 and 802-3 each having 640×480 pixels. These memories are addressed by a write address generator 803 which counts sync timing pulses from sync generator 601 and generates a write address for every nine frames in a manner similar to that provided by the freeze frame and rate conversion circuit 51 of FIG. 4 as it treats the low resolution signal (see FIG. 8A). In this way, one frame is sampled for every 9 frames and written into the memories 802 and this sampling rate determines the frequency range of the temporal filter of the encoder 700. A read address code is supplied to the memories 802 from a microprocessor 804, or video signal processor, through an address bus 805. Memories 802 are connected through a data bus 806 to the microprocessor 804. Microprocessor 804 has an output connected to the second row of switch 701. Write address generator 803 is supplied with a proceed-to-write control signal from the switching control logic 703 and microprocessor 804 is supplied with a high/low resolution command signal from the control logic 703. In response to a high resolution command signal, the microprocessor establishes a flag=1 and resets it to flag=0 when a low resolution command is issused.

Figure 24:
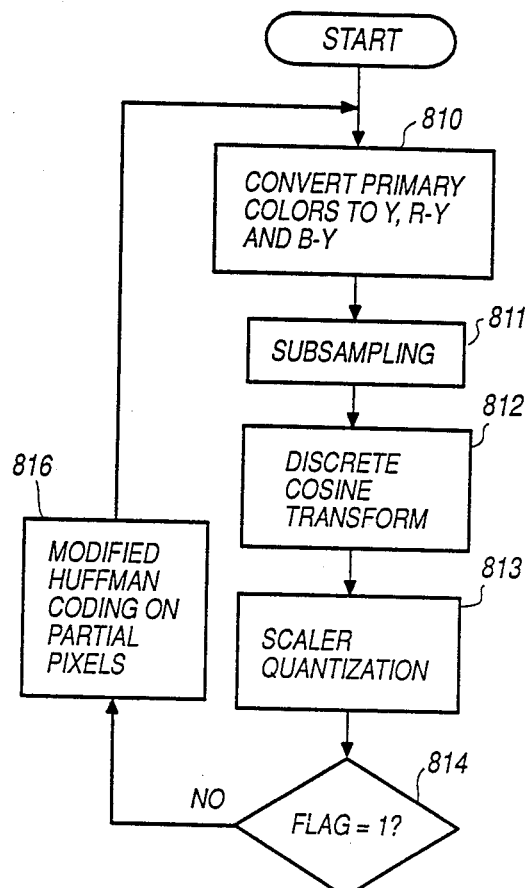
FIG. 24 is a flowchart describing the operation of the microprocessor of FIG. 23.
Figure 25:
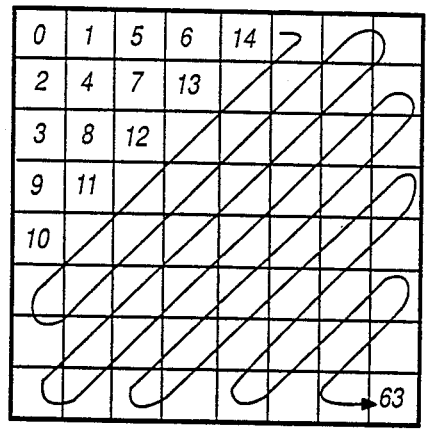
FIG. 25 is an illustration of a block of $8 \times 8$ cells showing a sequence in which pixels are retrieved from the cells.

FIG. 24 is a flowchart describing the operation of the microprocessor 804. The program starts with operations block 810 in which the RGB signals of the NTSC color television format are converted to the luminance Y, color difference signals R-Y and B-Y by performing known matrix operations on pixels stored in corresponding cells of the memories 802-1, 802-2, 802-3. The processed pixels are stored back into the memories 802 overwriting the original pixel data so that the Y, R-Y and B-Y pixel data are stored into memories 802-1, 802-2 and 802-3, respectively. When all the pixel data are converted to the Y, R-Y and B-Y signals, control exits to operations block 811 which directs the sequential reading of the color difference data R-Y and B-Y from memories 802-2 and 802-3 and directs the 2-to-1 subsampling of pixels, i.e, sampling one pixel for every two retrieved pixels in both the horizontal and vertical directions, thereby reducing the number of pixels by ¼ the original quantity. This data compression is to take advantage of the fact that the human eyes are less sensitive to colors than they are to luminance. With the chrominance components being reduced to ¼ the original quantity, a total of the luminance and chrominance components gives a data compression ratio which is one half the original total quantity. During a monochrome mode, the subtracting sampling process is bypassed. Exit then is to operations block 812 which directs the reading of data from 8×8 cells (which form a block) from each memory 802 and performs discrete cosine transform (DCT) on the retrieved 64 pixels which are then stored back into the original cell positions. This DCT conversion determines the resolution and hence the spatial frequency filter of the encoder 700. With the DCT conversion, the upper left corner of each block is filled with a pixel representing an average DC level of all the pixels of the block. Pixels in the rows and columns of each block represent the AC components of the signal and are arranged in an ascending order of resolution in a direction from left to right and in a direction from top to bottom. The amplitudes of the DCT data of each block vary widely. Typically, natural objects result in a large amplitude value at the upper left corner of the block and a zero amplitude value at the lower right corner of the block. Control then exits to operations block 813 which directs the processing of scalar quantization on data retrieved from the memories. Specifically, control determines in which one of significant discrete values, known as DCT coefficients, each of the retrieved pixel value falls and produces a logic 1 or 0 for each pixel, depending on the determination. Exit then is to decision block 814 which determines if there is a flag=1 or flag=0. If there is a flag=1, indicating that a high resolution command is supplied to the microprocessor, control exits to operations block 815 in which the quantized data of each block are sequentially retrieved in a manner as indicated by the arrow in FIG. 25 and a modified Huffman coding is performed on the retrieved data. This coding process involves a run length coding of the logic 1's and 0's of the quantized values and an entropy coding of the DCT coefficients. For high resolution pictures, the modified Huffman coding is performed in block 815 on all pixels retrieved from cells #0 to #63 and control exits to the end of the program. If there is a flag =0, exit is to operations block 816 which directs the retrieving of pixels from cells #0 to #5 and the performing of the modified Huffman coding on such pixels, and control then returns to block 810 to repeat the process on the next frame. Thus, for high resolution pictures the process is executed only once for the transmission of a freeze frame picture and for low resolution pictures the process is repeated. Experiments showed that with the above described coding technique, a data compression ratio of 1/6 to 1/32 can be achieved without introducing noticeable degradation of picture quality. The input per pixel data of 24 bits (=3×8) can be reduced to 0.75 to 4 bits per pixel. A data compression of down to 0.1 to 0.75 bits per pixel can be achieved if allowance is made for the degradation of image gradation as well as resolution. The following relations were obtained between entropy (bits/pixel) and frame transmission time (seconds/frame) of a color video over a 64-kbps ISDN exchange line.

| Entropy | Transmission Time |
| --- | --- |
| 24 | 115 |
| 4 | 19.2 |
| 0.75 | 3.6 |
| 0.2 | 0.96 |
| 0.1 | 0.48 |

Figure 26:
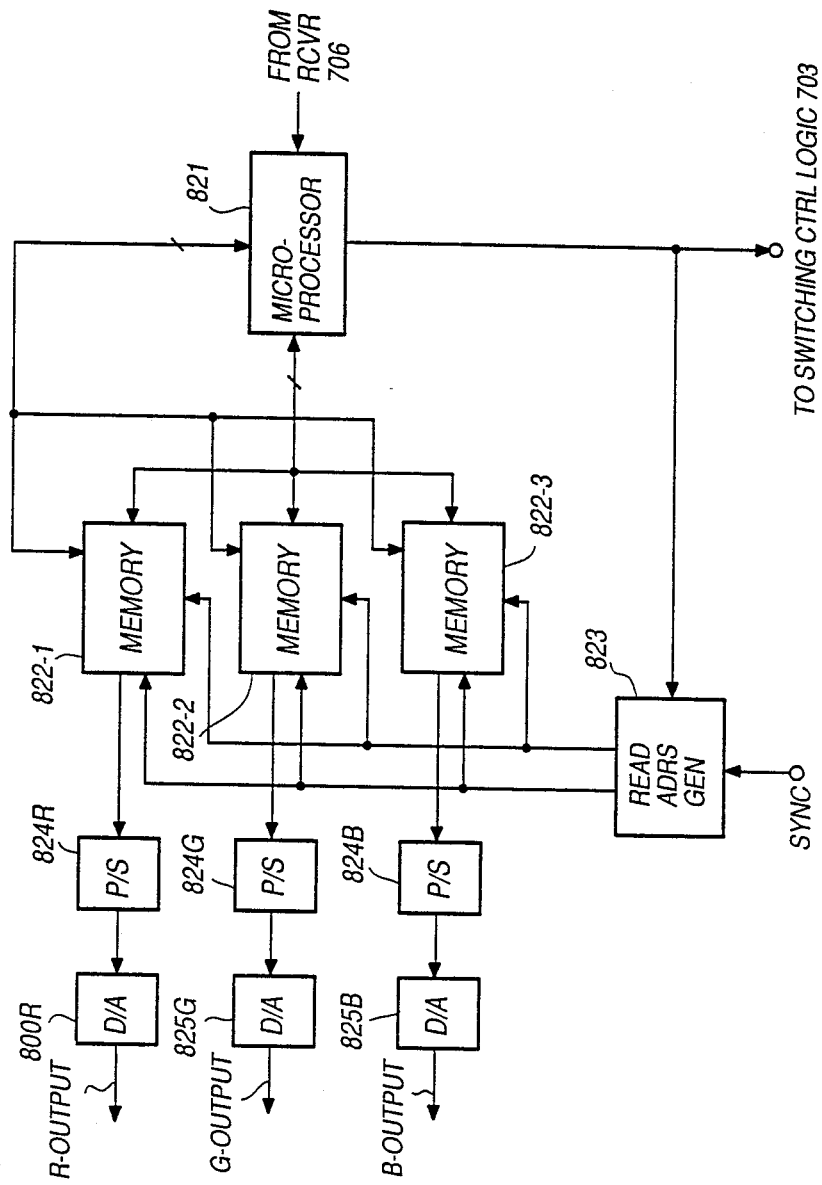
FIG. 26 is a block diagram of the decoding circuit of FIG. 21.
Figure 27:
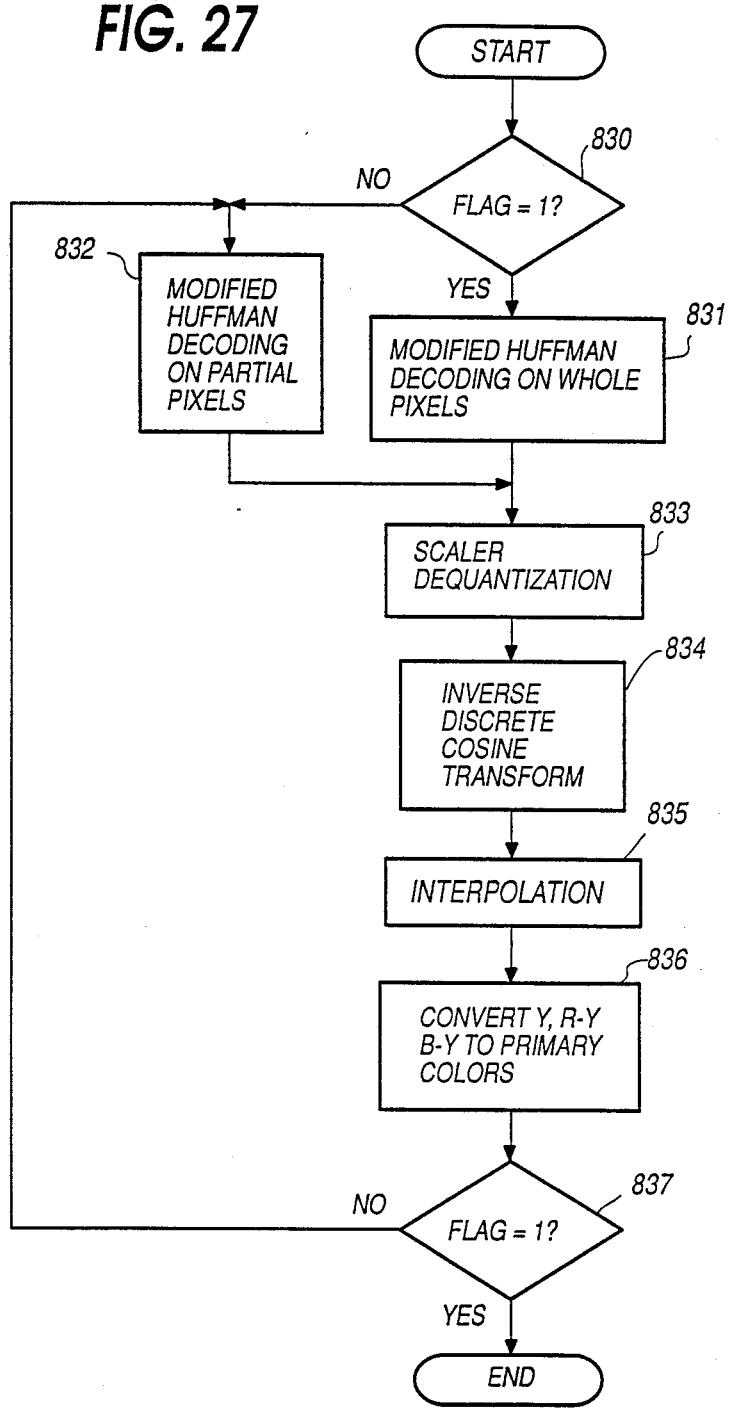
FIG. 27 is a flowchart of the microprocessor of FIG. 26.

Decoder 704 involves a process inverse to that of the encoder 700. As shown in FIG. 26, decoder 704 includes a microprocessor 821 connected to the output of receiver 706 to perform a decoding process on the received signal in a manner as shown in FIG. 27. Dual port memories 822-1 to 822-3 are connected to the output of microprocessor 821 to cooperate with it to write received data into the memories to perform the decoding process. recovering the R, G, B primary color signals. A read address generator 823, which is connected to the memories 822, responds to a control signal supplied from the microprocessor 821 to read the recovered data into parallel-to-serial converters 824R, 824G, 824B whose outputs are respectively coupled to D/A converters 825R, 825G and 825B. The operation of the microprocessor 821 begins with decision block 830 which checks for the presence of a flag=1 indicating the reception of a high resolution signal or a flag=0 indicating the reception of a low resolution signal. If flag=1 exists, exit is to operations block 831 which directs the performing of an modified Huffman decoding on all pixels of each block. If flag=0 exists, exit is to operations block 832 to perform a modified Huffman decoding on pixels in cells #0 to #5 of each block. Operations blocks 831 and 832 are followed by a sequence of operations blocks 833, 834, 835 and 836. In block 833, scaler dequantization is performed in a manner inverse to the scaler quantization performed by operations block 813 of FIG. 24. DCT reconversion process inverse to that of the process of block 824 is performed by operations block 834. Operations block 835 performs interpolation between successive pixels derived by the DCT decoding process to recover the luminance Y and color difference signals R-Y, B-Y. The interpolation is followed by operations block 836 which performs the conversion of the luminance and color difference signals into the primary color signals. Exit from block 836 is to decision block 837 to check for the presence and absence of a flag=1 or 0. If a high resolution signal has been processed, control exits to the end of the program and if otherwise, exit is to block 832 to repeat the process.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A videotelephone apparatus comprising:
image pickup means for generating first and second high frame rate video signals representative of moving objects and objects which are standing still, respectively;
conversion means for converting said first high frame rate video signal to a low frame rate low resolution signal and converting the second high frame rate video signal to a single frame high resolution signal, each frame of said low frame rate low resolution signal having n×m pixels and the frame of said high resolution signal having N×M pixels, where N and M are respectively greater than n and m;
transmit means for transmitting said low frame rate low resolution signal and said single frame high resolution signal via a transmission medium to a destination apparatus;
receive means including a memory for receiving a low frame rate low resolution signal and a single frame high resolution signal from said destination apparatus and for storing said single frame high resolution signal into said memory and repeatedly retrieving it from the memory;
display means;
manually operated command entry means for generating a plurality of mode select signals in response to manual command inputs; and
switching means responsive to said mode select signals for selectively coupling said low rate low resolution multiframe signal and said single frame high resolution signal to said transmit means and coupling signals from said receive means to said display means.

2. A videotelephone apparatus as claimed in claim 1, wherein said conversion means comprises means for converting said second high frame rate video signal to a multiframe high resolution signal and converting same to said single frame high resolution signal, and wherein said manually operated command entry means generates a framing command signal and transmit command signal, wherein said switching means is responsive to said framing command signal for coupling said multiframe high resolution to said display means and responsive to said transmit command signal for decoupling said multiframe high resolution signal from said display means and coupling said single frame high resolution signal to said display means.

3. A videotelephone apparatus as claimed in claim 2, wherein said switching means decouples said low rate low resolution multiframe signal from said transmit means in response to said transmit command signal and recouples said low rate low resolution multiframe signal to said transmit means at the end of transmission of said single frame high resolution signal.

4. A videotelephone apparatus as claimed in claim 3, wherein said display means include a memory for storing a frame of said low frame rate low resolution multiframe signal and continuously displaying the stored frame during the transmission of said single frame high resolution signal.

5. A videotelephone apparatus as claimed in claim 1, wherein said conversion means comprises means for converting said second high frame rate video signal to a multiframe high resolution signal and converting same to said single frame high resolution signal, and wherein said manually operated command entry means generates a framing command signal, further comprising still picture detecting means responsive to said framing command signal for detecting a still picture in said multiframe high resolution signal, wherein said switching means is responsive to said framing command signal for coupling said multiframe high resolution signal to said display means and responsive to the detection of said still picture by said still picture detecting means for decoupling said multiframe high resolution signal from said display means and coupling said single high resolution signal to said display means.

6. A videotelephone apparatus as claimed in claim 5, wherein said still picture detecting means comprises:
   frame delay means for introducing a delay of a frame interval to said multiframe high resolution signal;
   means for detecting a difference between an output signal from said frame delay means and said multiframe high resolution signal on a per pixel basis;
   means for integrating a plurality of said differences generated in each frame interval to produce a sum;
   means for comparing said sum with a predetermined value to produce a logic output at one of two discrete values depending on the relative value of said sum to said predetermined value;
   means for storing the logic outputs generated in each frame interval into a series of cells to produce a frame-by-frame bit patterns; and
   means responsive to said framing command signal for detecting a match between said frame-by-frame bit pattern and a prescribed bit pattern and supplying a signal to said switching means as an indication that a freeze frame is detected.

7. A videotelephone apparatus as claimed in claim 6, further comprising an arm hinged at one end thereof and movable between a rest position and an upright position, wherein said image pickup means is mounted at the other end of said arm to generate said first high frame rate video signal when said arm is in said rest position and generate said second high frame rate video signal when said arm is in said upright position, and a switch means located adjacent a pivot point of said arm to generate said framing command signal when said arm is brought to said upright position.

8. A videotelephone apparatus as claimed in claim 5, further comprising an arm hinged at one end thereof and movable between a rest position and an upright position, wherein said image pickup means is mounted at the other end of said arm to generate said first high frame rate video signal when said arm is in said rest position and generate said second high frame rate video signal when said arm is in said upright position, and a switch means located adjacent a pivot point of said arm to generate said framing command signal when said arm is brought to said upright position.

9. A videotelephone apparatus as claimed in claim 1, further comprising image enlarging means for multiplying each pixel of the low frame rate low resolution signal received by said receive means by a factor $N \times M / n \times m$ to enlarge the $(n \times m)$ pixel plane of said received signal to an $(N \times M)$ pixel plane, wherein said display means provides a display of the enlarged low resolution signal on an $(N \times M)$ pixel plane.

10. A videotelephone apparatus as claimed in claim 9, wherein said display means comprises a fist display having an $(n \times m)$-pixel plane and a second display having an $(N \times M)$-pixel plane, and wherein said image enlarging means is connected to said second display and said switching means includes means for coupling the low resolution signal received by said receive means to said image enlarging means.

11. A videotelephone apparatus as claimed in claim 10, wherein said first and second displays are vertically spaced from each other, and wherein said image pickup means comprises a first video camera for generating said first video output signal and a second video cameras for generating said second video output signal, said first video cameras being located between said first and second displays, said second camera being mounted on a support movable with respect to said object which is standing still.

12. A videotelephone apparatus as claimed in claim 1, further comprising:
   a screen touch sensor for generating a coordinate signal indicating a point specified on said display means in a coordinate system; and
   marker generating means for generating a marker code in response to said coordinate signal and applying the marker code to said transmit means and to said display means.

13. A videotelephone apparatus as claimed in claim 12, wherein each of the frames of said low frame rate low resolution signal is preceded by a header containing a first identifier and said single frame high resolution signal comprises a plurality of successive subframes each being preceded by a header containing a second identifier and said marker code.

14. A videotelephone apparatus as claimed in claim 13, wherein said image pickup means includes means for generating a sync timing signal and supplying the sync timing signal to said conversation means to permit a generation of said low frame rate low resolution signal and said single frame high resolution signal, and wherein said switching means comprises means for coupling said sync timing signal to said display means and said transmit means and coupling a sync timing signal received by said receive means to said display means.

15. A videotelephone apparatus as claimed in claim 1, wherein said display means comprises a first display having an $(n \times m)$-pixel plane and a second display pixel plane, said first display is located in a position higher than said second display.

16. A videotelephone apparatus as claimed in claim 1, further comprising an arm hinged at one end thereof and movable between a rest position and an upright position, wherein said image pickup means is mounted at the other end of said arm to generate said first video output signal when said arm is in said rest position and generate said second video signal when said arm is in said upright position.

17. A videotelephone apparatus as claimed in claim 16, wherein said apparatus is housed in a housing comprising a front portion having a low profile for mounting a numeric key pad and a rear portion having a higher profile, said display means being located in said rear portion.

18. A videotelephone apparatus comprising:
   image pickup means for generating first and second high frame rate video signals representative of moving objects and objects which are standing still, respectively;
   first conversion means for converting said first high frame rate video signal to a multiframe low resolution display signal and converting the second high frame rate video signal to a multiframe high resolution display signal, each frame of said low resolution display signal having n×m pixels and each frame of said high resolution display signal having N×M pixels, where N and M are respectively greater than n and m;
   second conversion means for converting said low resolution display signal to a low frame rate low resolution signal having a lower frame rate than the frame rate of said first video signal and converting said high resolution display signal to a single frame high resolution signal;
   transmit means for transmitting said low frame rate low resolution signal and said single frame high resolution signal via a transmission medium to a destination apparatus;
   receive means including a memory for receiving low frame rate low resolution signal and a single frame high resolution signal from said destination apparatus and for storing the received high resolution signal into said memory and repeatedly retrieving it from said memory;
   display means;
   manually operated command entry means for generating a plurality of mode select signals in response to manual command inputs; and
   switching means responsive to said mode select signals for selectively coupling said low and high resolution display signals from said first conversion means to said display means and to said second conversion means and coupling output signals of said receive means to said display means.

19. A videotelephone apparatus as claimed in claim 18, wherein said manually operated command entry means generates a framing command signal and a transmit command signal, wherein said switching means is responsive to said framing command signal for coupling said high resolution display signal to said display means and responsive to said transmit command signal for decoupling said high resolution display signal from said display means and coupling said single frame high resolution signal to said display means instead of said high resolution display signal.

20. A videotelephone apparatus as claimed in claim 18, wherein said manually operated command entry means generates a framing command signal, further comprising still picture detecting means responsive to said framing command signal for detecting a still picture in said high resolution display signal, wherein said switching means is responsive to said framing command signal for coupling said high resolution display signal to said display means and responsive to the detection of said still picture by said still picture detecting means for decoupling said high resolution display signal from said display means and coupling said single frame high resolution signal to said display means instead of said high resolution display signal.

21. A videotelephone apparatus as claimed in claim 20, wherein said still picture detecting means comprises:
   frame delay means for introducing a delay of a frame interval to said high resolution display signal;
   means for detecting a difference between an output signal from said frame delay means and said high resolution display signal on a per pixel basis;
   means for integrating a plurality of said differences generated within a frame interval to produce a sum;
   means for comparing said sum with a predetermined value to produce one of two logical values depending on the relative value of said sum to said predetermined value;
   means for storing the logical values over a frame interval to produce a frame-by-frame bit pattern; and
   means responsive to said framing command signal for detecting a match between said frame-by-frame bit pattern with a prescribed bit pattern and supplying a signal to said switching means as an indication that a still picture is detected.

22. A videotelephone apparatus as claimed in claim 20, further comprising an arm hinged at one end thereof and movable between a rest position and an upright position, wherein said image pickup means is mounted at the other end of said arm to generate said first high frame rate video signal when said arm is in said rest position and generate said second high frame rate video signal when said arm is in said upright position, and a switch means located adjacent a pivot point of said arm to generate said framing command signal when said arm is brought to said upright position.

23. A videotelephone apparatus as claimed in claim 20, further comprising an arm hinged at one end thereof and movable between a rest position and an upright position, wherein said image pickup means is mounted at the other end of said arm to generate said first high frame rate video signal when said arm is in said rest position and generate said second high frame rate video signal when said arm is in said upright position, and a switch means located adjacent a pivot point of said arm to generate said framing command signal when said arm is brought to said upright position.

24. A videotelephone apparatus as claimed in claim 18, further comprising means for multiplying each pixel of a low frame rate low resolution signal received by said receive means by a factor N×M/n×m to enlarge the (n×m) pixel plane of said received signal to an (N×M) pixel plane, wherein said display means provides a display of the enlarged low signal on an (N×M) pixel plane.

25. A videotelephone apparatus as claimed in claim 24, wherein said display means comprises a first display having an (n×m)-pixel plane and a second display having an (N×M)-pixel plane, and wherein said image enlarging means is connected to said second display and said switching means includes means for coupling the low frame rate low resolution signal received by said receive means to said image enlarging means.

26. A videotelephone apparatus as claimed in claim 25, wherein said first and second displays are vertically spaced from each other, and wherein said image pickup means comprises a first video camera for generating said first video output signal and a second video camera for generating said second video output signal, said first video camera being located between first and second displays, said second camera being mounted on a support movable with respect to said object which is standing still.

27. A videotelephone apparatus as claimed in claim 18, further comprising:
a screen touch sensor for generating a coordinate signal indicating a point specified on said display means in a coordinate system; and
market generating means for generating a marker code in response to said coordinate signal and applying the marker code to said transmit means and to said display means.

28. A videotelephone apparatus as claimed in claim 27, wherein each of the frames of said low frame rate low resolution signal is preceded by a header containing a first identifier and said single frame high resolution signal comprises a plurality of successive subframes each being preceded by a header containing a second identifier and said marker code.

29. A videotelephone apparatus as claimed in claim 18, wherein said second conversion means comprises:
a frame memory having an (N×M)-pixel plane;
write address generator means for generating first and second write address codes for writing one of a plurality of successive frames of said low resolution display signal into an (n×m)-pixel plane portion of said frame memory and writing a single frame of said high resolution display signal into the full (N×M)-pixel plane of said memory; and
read address generator means for generating read address codes for reading the stored frame from said (n×m)-pixel portion of said memory at a rate lower than a rate at which stored frame is written into said memory to produce said low frame rate low resolution signal, and reading said single frame of said second display signal from said memory at a rate lower than a rate at which the stored single frame is written into said memory to produce said single frame high resolution signal.

30. A videotelephone apparatus as claimed in claim 18, further comprising an arm hinged at one end thereof and movable between a rest position and an upright position, wherein said image pickup means is mounted at the other end of said arm to generate said first high frame rate video signal when said arm is in said rest position and generate said second high frame rate video signal when said arm is in said upright position.

31. A videotelephone apparatus as claimed n claim 30, wherein said apparatus is housed in a housing comprising a front portion having a low profile for mounting a numeric key pad and a rear portion having a higher profile, said display means being located in said rear portion.

32. A videotelephone apparatus as claimed in claim 18, wherein said image pickup means includes means for generating a sync timing signal and supplying the sync timing signal to said first conversion means to permit generation of said multiframe low and high resolution signals, and wherein said switching means comprises means for coupling said sync timing signal to said display means, said second conversion means and said transmit means and for coupling a sync timing signal received by said receive means to said display means.

33. A videotelephone apparatus comprising:
image pickup means for generating first and second video output signals representative of moving objects and objects which are standing still, respectively;
data compression means for converting said first video output signal of said image pickup means to a low resolution multiframe signal according to a data compression algorithm and converting the second video output signal of said image pickup means to a high resolution single frame signal according to said data compression algorithm;
transmit means for transmitting said low resolution multiframe signal and said high resolution single frame signal via a transmission medium to a destination apparatus;
receive means including a memory for receiving a low resolution multiframe signal and a single frame high resolution signal from said destination apparatus, and for storing said single frame high resolution signal into said memory and repeatedly retrieving it from the memory;
data decompression means for respectively converting the received low resolution multiframe signal and the received high resolution single frame signal to signals identical in format to said first and second video output signals generated by said image pickup means according to a data expansion algorithm inverse to said data compression algorithm;
display means;
manually operated command entry means for generating a plurality of mode select signals in response to manual command inputs; and
switching means responsive to said mode select signals for selectively coupling said first and second video output signals from said image pickup means, coupling said low and high resolution multiframe signals from said data compression means to said display means and said transmit means, and coupling said signals converted by said data expansion means to said display means.

34. A videotelephone apparatus as claimed in claim 33, wherein said data compression means comprises first and second coding circuits having a hierarchical coding algorithm for respectively converting said first and second video output signals to said low resolution multiframe signal and said high resolution single frame signal.

35. A videotelephone apparatus as claimed in claim 33, where said data compression means includes:
a plurality of spatial frequency filters of different resolutions and passing said first and second video output signals of said image pickup means through said spatial frequency filters to develop differential video signals of different levels of resolution; and
means for successively supplying said differential video signals to said transmit means with the lowest level of resolution first and an intermediate level of resolution last for generating said low resolution multiframe signal and successively supplying said differential video signals with the lowest level of resolution first and the highest level of resolution last for generating said high resolution single frame signal.

36. A videotelephone apparatus as claimed in claim 33, wherein said data compression means comprises:
a frame memory comprising a plurality of blocks;

a write address generator for writing said first and second video output signals into said frame memory at a frame rate lower than the frame rate of said video output signals; and a microprocessor connected to the output of said frame memory, said microprocessor being programmed to perform the steps of:

(a) performing discrete cosine transform on data stored in said frame memory on a block by block basis;

(b) performing scaler quantization on the data of step (a);

(c) performing modified Huffman coding on the data of step (b) stored in a smaller portion of each of said blocks in response to a first control signal from said switching means and repeating the steps (a) to (c) to generate said low frame rate low resolution signal; and (d) performing said modified Huffman coding on the data of step (b) stored in a greater portion of each of said blocks in response to a second control signal from said switching means to product said single frame high resolution signal.

37. A videotelephone apparatus as claimed in claim 33, wherein each of said first and second video output signals is a triplet of primary color signals, and wherein said data compression means comprises:

first, second and third frame memories each comprising a plurality of blocks;

a write address generator for writing the primary color components of either of said first and second video output signals into said first, second and third frame memories respectively, at a frame rate lower than the frame rate of said video output signals; and a microprocessor connected to the output of said frame memory, said microprocessor being programmed to perform the steps of:

(a) converting said primary color components stored in said frame memories into a luminance and color difference components;

(b) subsampling said color difference components;

(c) performing a discrete cosine transform on data of steps (a) and (b) on a block by block basis;

(d) performing scaler quantization on the data of step (c);

(e) performing modified Huffman coding on the data of step (d) stored in a smaller portion of each of said blocks in response to a first control signal from said switching means (703) and repeating the steps (c) to (e) to generate said low frame rate low resolution signal; and (f) performing said modified Huffman coding on the data of step (d) stored in a greater portion of each of said blocks in response to a second control signal from said switching means to produce said single frame high resolution signal.

38. A videotelephone apparatus as claimed in claim 33, further comprising:

a screen touch sensor for generating a coordinate signal indicating a point specified on said display means in a coordinate system; and market generating means for generating a marker code in response to said coordinate signal and applying the marker code to said transmit means and to said display means.

39. A videotelephone apparatus as claimed in claim 38, wherein each of the frame of said low frame rate low resolution signal is preceded by a header containing a first identifier and said single frame high resolution signal comprises a plurality of successive subframes each being preceded by a header containing a second identifier and said marker code.

40. A videotelephone apparatus as claimed in claim 33, further comprising an arm hinged at one end thereof and movable between a rest position and an upright position, wherein said image pickup means is mounted at the other end of said arm to generate said first video output signal when said arm is in said rest position and generate said second video signal when said arm is in said upright position.

41. A videotelephone apparatus as claimed in claim 40, wherein said apparatus is housed in a housing comprising a front portion having a low profile for mounting a numeric key pad and a rear portion having a higher profile, said display means being located in said rear portion.

* * * * *